United States Patent
Yang et al.

(10) Patent No.: US 9,967,817 B2
(45) Date of Patent: May 8, 2018

(54) ADAPTIVE SELECTION OF INTER-RAT MEASUREMENT METHODS

(71) Applicant: QUALCOMM Incorporated, San Diego, CA (US)

(72) Inventors: Ming Yang, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 290 days.

(21) Appl. No.: 14/802,915

(22) Filed: Jul. 17, 2015

(65) Prior Publication Data

US 2017/0019852 A1    Jan. 19, 2017

(51) Int. Cl.
*H04W 36/00* (2009.01)
*H04W 52/02* (2009.01)
*H04W 24/08* (2009.01)

(52) U.S. Cl.
CPC ....... *H04W 52/0216* (2013.01); *H04W 24/08* (2013.01); *H04W 36/0088* (2013.01); *H04W 36/0022* (2013.01); *Y02B 60/50* (2013.01)

(58) Field of Classification Search
CPC . H04W 24/08; H04W 36/0083; H04W 36/14; H04W 52/0216; Y02B 60/50
USPC ......................................................... 370/252
See application file for complete search history.

(56) References Cited

U.S. PATENT DOCUMENTS

| | | | |
|---|---|---|---|
| 2009/0046641 A1* | 2/2009 | Wang | H04W 74/002 370/329 |
| 2010/0316034 A1* | 12/2010 | Burbidge | H04W 36/0022 370/338 |
| 2011/0105122 A1 | 5/2011 | Wu | |
| 2012/0164948 A1 | 6/2012 | Narasimha et al. | |
| 2012/0263054 A1 | 10/2012 | Kazmi et al. | |
| 2013/0329589 A1 | 12/2013 | Cave et al. | |
| 2014/0140223 A1* | 5/2014 | Yang | H04W 36/0088 370/252 |
| 2014/0335909 A1* | 11/2014 | Czerepinski | H04W 52/40 455/522 |

OTHER PUBLICATIONS

International Search Report and Written Opinion—PCT/US2016/037909—ISA/EPO—Oct. 12, 2016.
(Continued)

*Primary Examiner* — Omar Ghowrwal
*Assistant Examiner* — Kokou R Detse
(74) *Attorney, Agent, or Firm* — Seyfarth Shaw LLP

(57) ABSTRACT

A user equipment (UE) is configured to adaptively switch between different techniques/methods for performing inter-frequency or inter-radio access technology measurement. The UE may use one technique for measurement based on certain communication conditions and in response to a change in communication conditions may switch to another measurement technique. Different techniques may be used such as using a network configured communication gap, using a connected discontinuous reception cycle off-period for measurement, or other techniques.

20 Claims, 16 Drawing Sheets

(56) References Cited

OTHER PUBLICATIONS

Nokia Corporation et al., "Inter-frequency Measurements gap for UE with single chip implementation," 3GPP Draft; R4-136836, 3rd Generation Partnership Project (3GPP), Mobile Competence Centre ; 650, Route Des Lucioles ; F-06921 Sophia Antipolis Cedex ; France vol. RAN WG4, no. San Francisco, USA; Nov. 11, 2013-Nov. 15, 2013 Nov. 12, 2013 (Nov. 12, 2013), XP050739710, Retrieved from the Internet: URL:http://www.3gpp.org/ftp/Meetings_3GPP_SYNC/RAN/RAN4/Docs/ [retrieved on Nov. 12, 2013], 3 pages.

Samsung Electronics: "3GPP Long Term Evolution Radio Interface Protocols UE Mobility," 3GPP Draft; R2-051716 UE Mobility, 3rd Generation Partnership Project (3GPP), Mobile Competence Centre ; 650, Route Des Lucioles ; F-06921 Sophia-Antipolis Cedex ; France, vol. RAN WG2, no. Nice, France; Jun. 20, 2005 Jun. 21, 2005, Jun. 16, 2005 (Jun. 16, 2005), XP050607809, [retrieved on Jun. 16, 2005], 7 pages.

\* cited by examiner

ADAPTIVE SELECTION OF INTER-RAT MEASUREMENT METHODS

BACKGROUND

Field

Aspects of the present disclosure relate generally to wireless communication systems, and more particularly, to adaptively selecting techniques/methods for inter or intra-radio access technology (RAT) measurement techniques depending on communication conditions experienced by a user equipment.

Background

Wireless communication networks are widely deployed to provide various communication services, such as telephony, video, data, messaging, broadcasts, and so on. Such networks, which are usually multiple access networks, support communications for multiple users by sharing the available network resources. One example of such a network is the universal terrestrial radio access network (UTRAN). The UTRAN is the radio access network (RAN) defined as a part of the universal mobile telecommunications system (UMTS), a third generation (3G) mobile phone technology supported by the 3rd Generation Partnership Project (3GPP). The UMTS, which is the successor to global system for mobile communications (GSM) technologies, currently supports various air interface standards, such as wideband-code division multiple access (W-CDMA), time division-code division multiple access (TD-CDMA), and time division-synchronous code division multiple access (TD-SCDMA). For example, China is pursuing TD-SCDMA as the underlying air interface in the UTRAN architecture with its existing GSM infrastructure as the core network. The UMTS also supports enhanced 3G data communications protocols, such as high speed packet access (HSPA), which provides higher data transfer speeds and capacity to associated UMTS networks. HSPA is a collection of two mobile telephony protocols, high speed downlink packet access (HSDPA) and high speed uplink packet access (HSUPA) that extends and improves the performance of existing wideband protocols.

As the demand for mobile broadband access continues to increase, there exists a need for further improvements in wireless technology. Preferably, these improvements should be applicable to LTE and other multi-access technologies and the telecommunication standards that employ these technologies.

SUMMARY

According to one aspect of the present disclosure, a method for wireless communication includes communicating with a serving base station using a first receiver. The method also includes determining a communication condition(s) experienced by the UE. The communication condition(s) may be whether an inter-radio access technology measurement (IRAT measurement) is for signal strength measurement or for synchronization channel decoding. The method also includes adaptively switching from a first technique for IRAT measurement to a second technique for IRAT measurement based at least in part on the at least one communication condition. The second technique may be at least one of using a communication gap configured by a network for IRAT measurement, using a connected discontinuous reception cycle (C-DRX) off period for IRAT measurement, using a second receiver to perform IRAT measurement, or autonomously creating a gap in communications with the serving base station and using the created gap for IRAT measurement.

According to another aspect of the present disclosure, an apparatus/user equipment for wireless communication includes means for communicating with a serving base station using a first receiver. The apparatus may also include means for determining a communication condition(s) experienced by the UE. The communication condition(s) may be whether an inter-radio access technology (IRAT) measurement is for signal strength measurement or for synchronization channel decoding. The apparatus may also include means for adaptively switching from a first technique for IRAT measurement to a second technique for IRAT measurement based at least in part on the at least one communication condition. The second technique may be at least one of using a communication gap configured by a network for IRAT measurement, using a connected discontinuous reception cycle (C-DRX) off period for IRAT measurement, using a second receiver to perform IRAT measurement, or autonomously creating a gap in communications with the serving base station and using the created gap for IRAT measurement.

Another aspect discloses an apparatus for wireless communication and includes a memory, a transceiver configured to communicate with a serving base station and at least one processor coupled to the memory. The processor(s) is configured to communicate with a serving base station using a first receiver. The processor(s) is also configured to determine a communication condition(s) experienced by the UE. The communication condition(s) may be whether an inter-radio access technology (IRAT) measurement is for signal strength measurement or for synchronization channel decoding. The processor(s) is also configured to adaptively switch from a first technique for IRAT measurement to a second technique for IRAT measurement based at least in part on the at least one communication condition. The second technique may be at least one of using a communication gap configured by a network for IRAT measurement, using a connected discontinuous reception cycle (C-DRX) off period for IRAT measurement, using a second receiver to perform IRAT measurement, or autonomously creating a gap in communications with the serving base station and using the created gap for IRAT measurement.

Yet another aspect discloses a computer program product for wireless communications in a wireless network having a non-transitory computer-readable medium. The computer-readable medium has non-transitory program code recorded thereon which, when executed by the processor(s), causes the processor(s) to communicate with a serving base station using a first receiver. The program code also causes the processor(s) to determine a communication condition(s) experienced by the UE. The communication condition(s) may be whether an inter-radio access technology (IRAT) measurement is for signal strength measurement or for synchronization channel decoding. The program code further causes the processor(s) to adaptively switch from a first technique for IRAT measurement to a second technique for IRAT measurement based at least in part on the at least one communication condition. The second technique may be at least one of using a communication gap configured by a network for IRAT measurement, using a connected discontinuous reception cycle (C-DRX) off period for IRAT measurement, using a second receiver to perform IRAT measurement, or autonomously creating a gap in communications with the serving base station and using the created gap for IRAT measurement.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
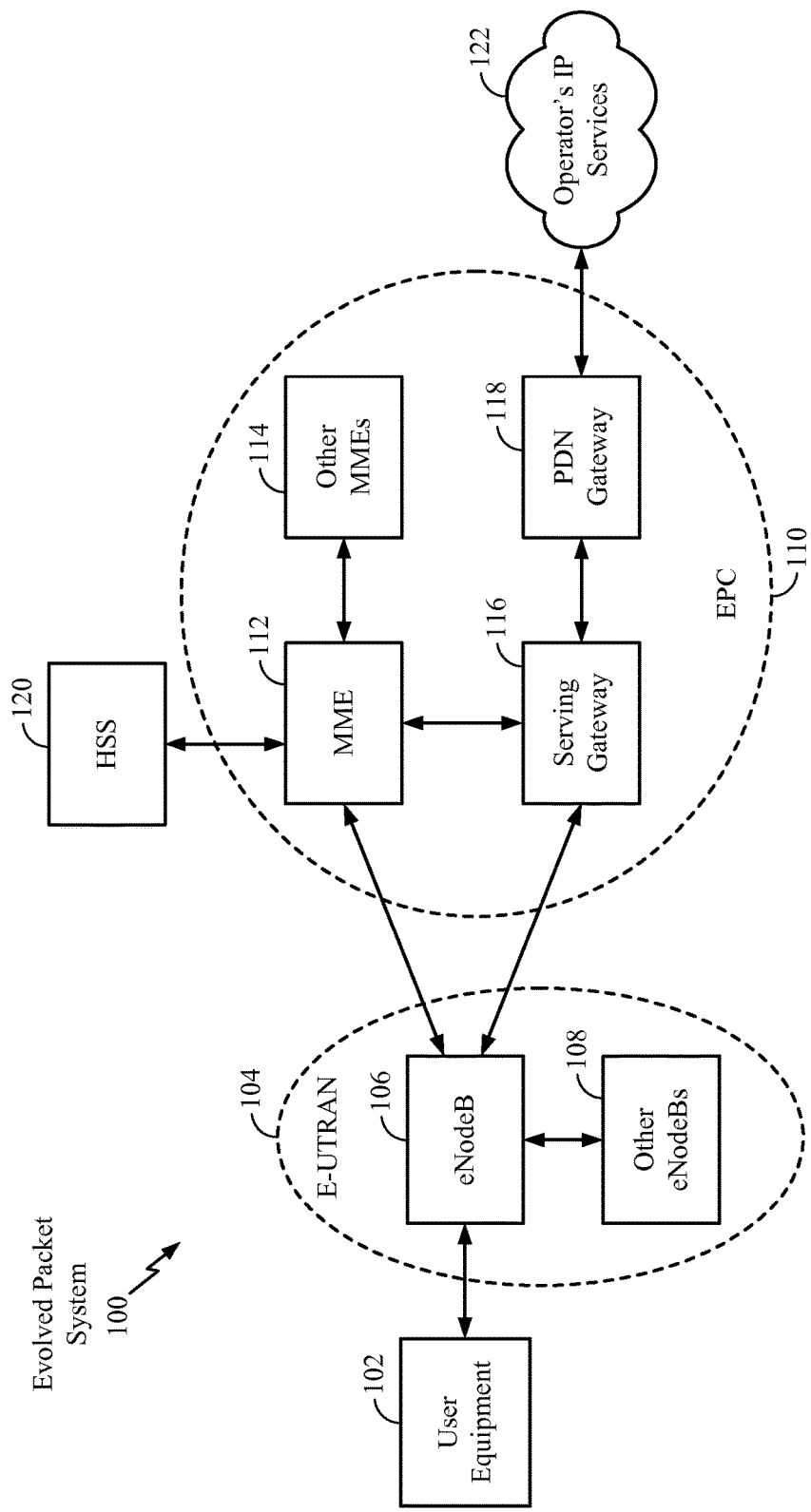
FIG. 1 is a diagram illustrating an example of a network architecture.

FIG. 1 is a diagram illustrating a network architecture 100 of a long term evolution (LTE) network. The LTE network architecture 100 may be referred to as an evolved packet system (EPS) 100. The EPS 100 may include one or more user equipment (UE) 102, an evolved UMTS terrestrial radio access network (E-UTRAN) 104, an evolved packet core (EPC) 110, a home subscriber server (HSS) 120, and an operator's IP services 122. The EPS can interconnect with other access networks, but for simplicity those entities/interfaces are not shown. As shown, the EPS 100 provides packet-switched services, however, as those skilled in the art will readily appreciate, the various concepts presented throughout this disclosure may be extended to networks providing circuit-switched services.

The E-UTRAN 104 includes an evolved NodeB (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a notebook, a netbook, a smartbook, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station or apparatus, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a mobility management entity (MME) 112, other MMEs 114, a serving gateway 116, and a packet data network (PDN) gateway 118. The MME 112 is the control node that processes the signaling between the UE 102 and the EPC 110. Generally, the MME 112 provides bearer and connection management. All user IP packets are transferred through the serving gateway 116, which itself is connected to the PDN gateway 118. The PDN gateway 118 provides UE IP address allocation as well as other functions. The PDN gateway 118 is connected to the operator's IP services 122. The operator's IP services 122 may include the Internet, the Intranet, an IP multimedia subsystem (IMS), and a PS streaming service (PSS).

Figure 2:
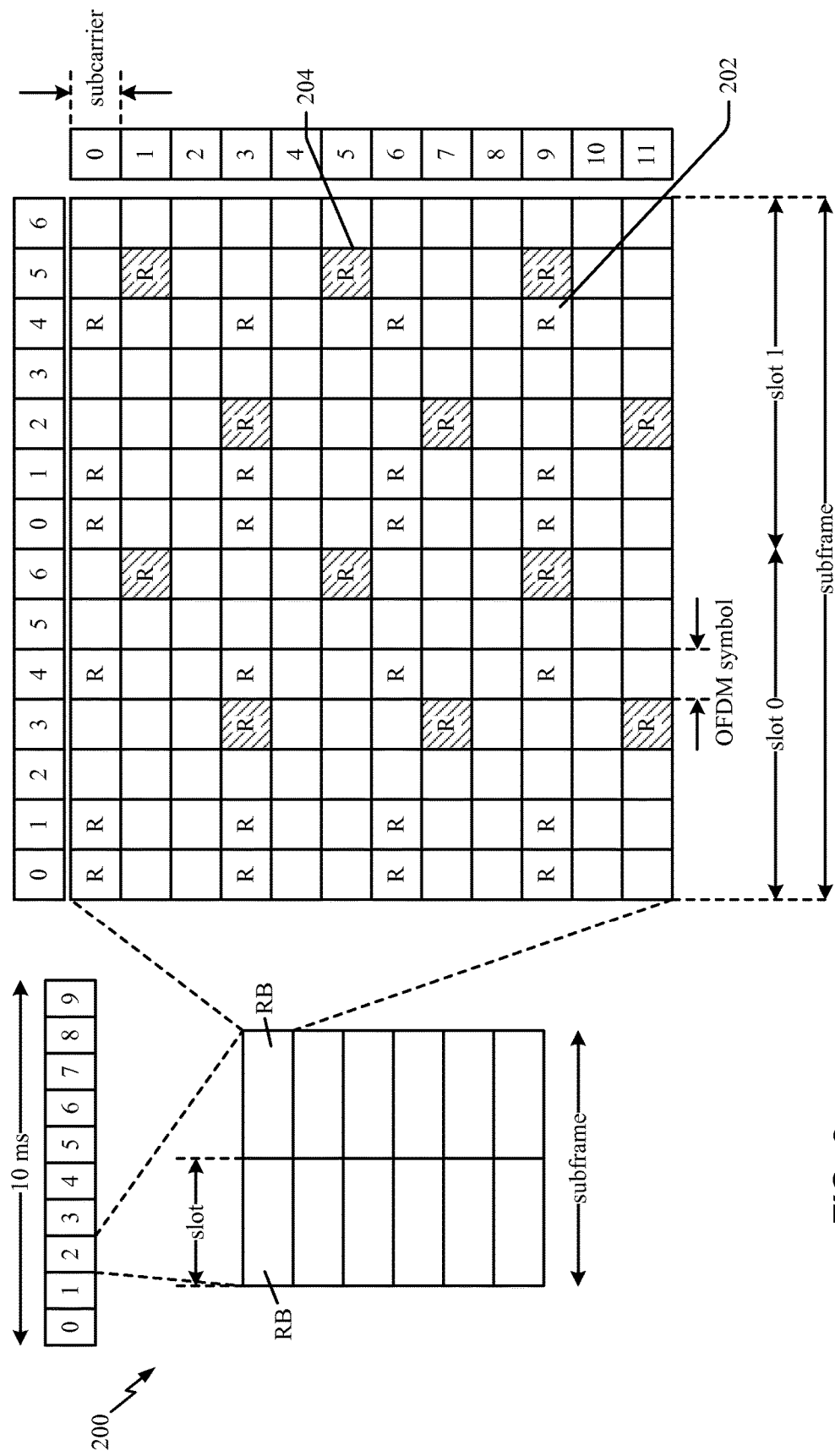
FIG. 2 is a diagram illustrating an example of a downlink frame structure in long term evolution (LTE).

FIG. 2 is a diagram 200 illustrating an example of a downlink frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 202, 204, include downlink reference signals (DL-RS). The DL-RS include Cell-specific RS (CRS) (also sometimes called common RS) 202 and UE-specific RS (UE-RS) 204. UE-RS 204 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 3:
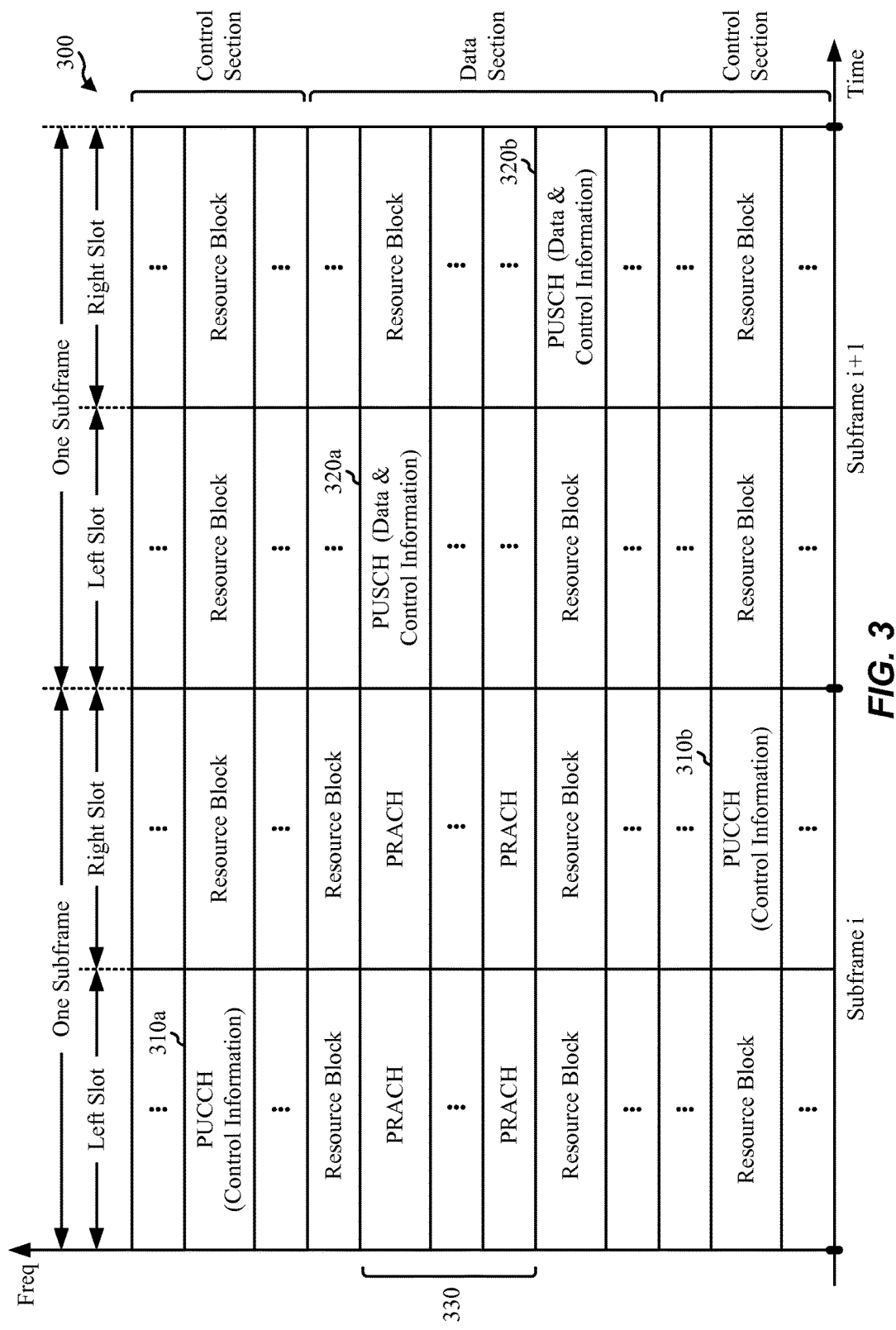
FIG. 3 is a diagram illustrating an example of an uplink frame structure in long term evolution (LTE).

FIG. 3 is a diagram 300 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 310a, 310b in the control section to transmit control information to an eNodeB. The UE may also be assigned resource blocks 320a, 320b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 330. The PRACH 330 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 4:
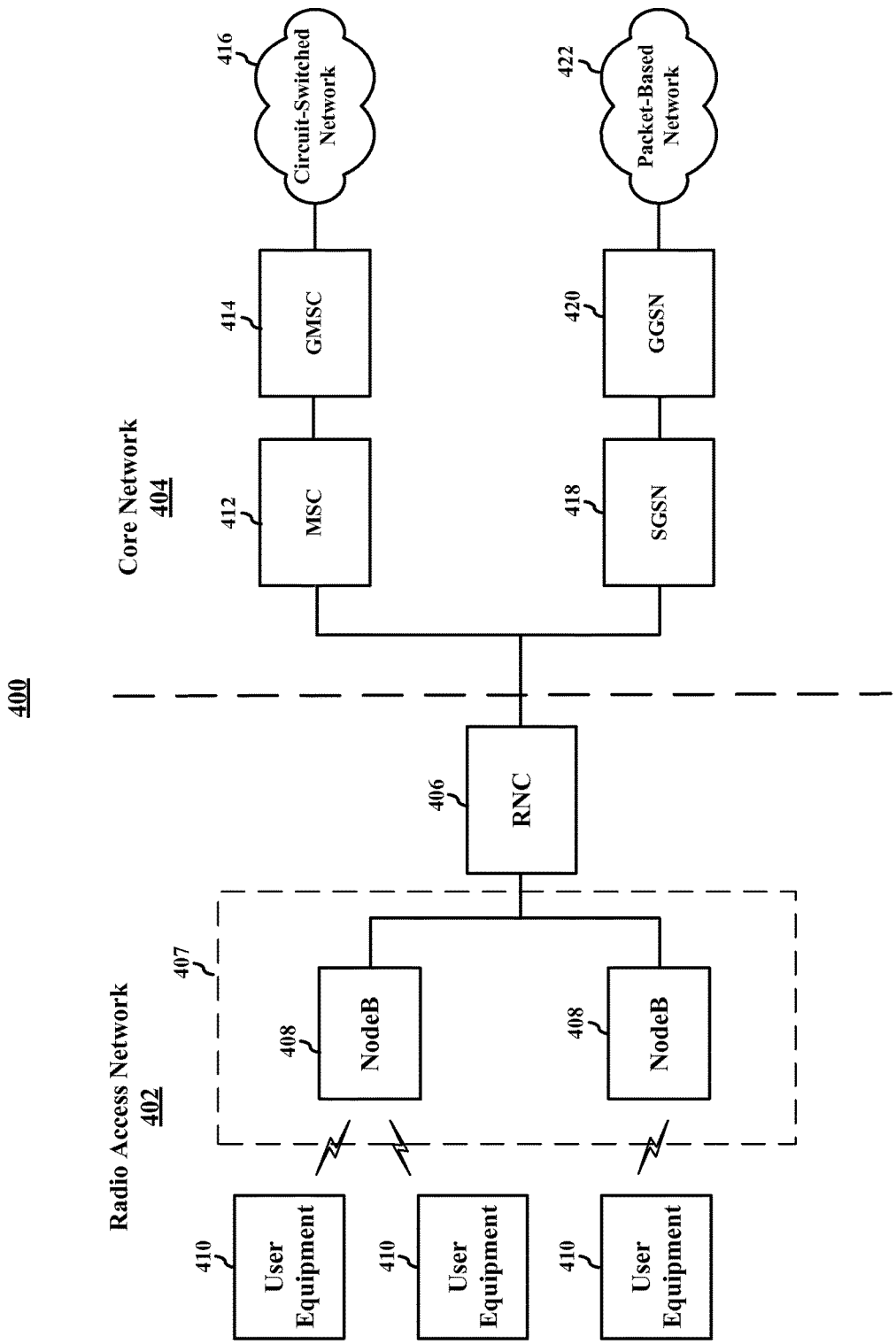
FIG. 4 is a block diagram conceptually illustrating an example of a telecommunications system employing a time division synchronous code division multiple access (TD-SCDMA) standard.

Turning now to FIG. 4, a block diagram is shown illustrating an example of a telecommunications system 400. The various concepts presented throughout this disclosure may be implemented across a broad variety of telecommunication systems, network architectures, and communication standards. By way of example and without limitation, the aspects of the present disclosure illustrated in FIG. 4 are presented with reference to a UMTS system employing a TD-SCDMA standard. In this example, the UMTS system includes a radio access network (RAN) 402 (e.g., UTRAN) that provides various wireless services including telephony, video, data, messaging, broadcasts, and/or other services. The RAN 402 may be divided into a number of radio network subsystems (RNSs) such as an RNS 407, each controlled by a radio network controller (RNC), such as an RNC 406. For clarity, only the RNC 406 and the RNS 407 are shown; however, the RAN 402 may include any number of RNCs and RNSs in addition to the RNC 406 and RNS 407. The RNC 406 is an apparatus responsible for, among other things, assigning, reconfiguring and releasing radio resources within the RNS 407. The RNC 406 may be interconnected to other RNCs (not shown) in the RAN 402 through various types of interfaces such as a direct physical connection, a virtual network, or the like, using any suitable transport network.

The geographic region covered by the RNS 407 may be divided into a number of cells, with a radio transceiver apparatus serving each cell. A radio transceiver apparatus is commonly referred to as a nodeB in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two nodeBs 408 are shown; however, the RNS 407 may include any number of wireless nodeBs. The nodeBs 408 provide wireless access points to a core network 404 for any number of mobile apparatuses. For illustrative purposes, three UEs 410 are shown in communication with the nodeBs 408. The downlink (DL), also called the forward link, refers to the communication link from a nodeB to a UE, and the uplink (UL), also called the reverse link, refers to the communication link from a UE to a nodeB.

The core network 404, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 404 supports circuit-switched services with a mobile switching center (MSC) 412 and a gateway MSC (GMSC) 414. One or more RNCs, such as the RNC 406, may be connected to the MSC 412. The MSC 412 is an apparatus that controls call setup, call routing, and UE mobility functions. The MSC 412 also includes a visitor location register (VLR) (not shown) that contains subscriber-related information for the duration that a UE is in the coverage area of the MSC 412. The GMSC 414 provides a gateway through the MSC 412 for the UE to access a circuit-switched network 416. The GMSC 414 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 414 queries the HLR to determine the UE's location and forwards the call to the particular MSC serving that location.

The core network 404 also supports packet-data services with a serving GPRS support node (SGSN) 418 and a gateway GPRS support node (GGSN) 420. General packet radio service (GPRS) is designed to provide packet-data services at speeds higher than those available with standard GSM circuit-switched data services. The GGSN 420 provides a connection for the RAN 402 to a packet-based network 422. The packet-based network 422 may be the Internet, a private data network, or some other suitable packet-based network. The primary function of the GGSN 420 is to provide the UEs 410 with packet-based network connectivity. Data packets are transferred between the GGSN 420 and the UEs 410 through the SGSN 418, which performs primarily the same functions in the packet-based domain as the MSC 412 performs in the circuit-switched domain.

The UMTS air interface is a spread spectrum direct-sequence code division multiple access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a nodeB 408 and a UE 410, but divides uplink and downlink transmissions into different time slots in the carrier.

Figure 5:
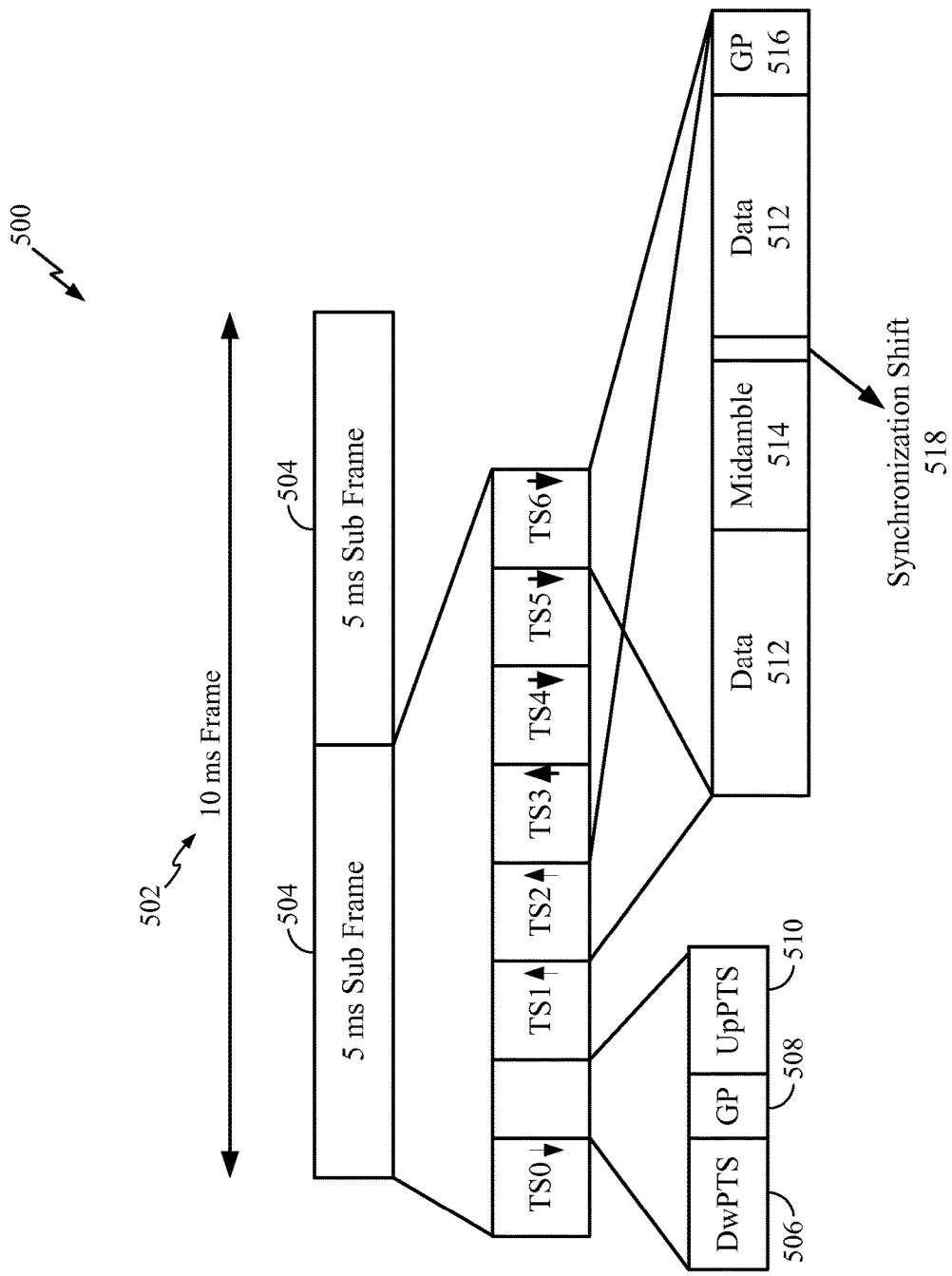
FIG. 5 is a block diagram conceptually illustrating an example of a frame structure for a time division synchronous code division multiple access carrier.

FIG. 5 shows a frame structure 500 for a TD-SCDMA carrier. The TD-SCDMA carrier, as illustrated, has a frame 502 that is 10 ms in length. The chip rate in TD-SCDMA is 1.28 Mcps. The frame 502 has two 5 ms subframes 504, and each of the subframes 504 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 506, a guard period (GP) 508, and an uplink pilot time slot (UpPTS) 510 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 512 (each with a length of 352 chips) separated by a midamble 514 (with a length of 144 chips) and followed by a guard period (GP) 516 (with a length of 16 chips). The midamble 514 may be used for features, such as channel estimation, while the guard period 516 may be used to avoid inter-burst interference. Also transmitted in the data portion is some Layer 1 control information, including synchronization shift (SS) bits 518. Synchronization shift bits 518 only appear in the second part of the data portion. The synchronization shift bits 518 immediately following the midamble can indicate three cases: decrease shift, increase shift, or do nothing in the upload transmit timing. The positions of the synchronization shift bits 518 are not generally used during uplink communications.

Figure 6:
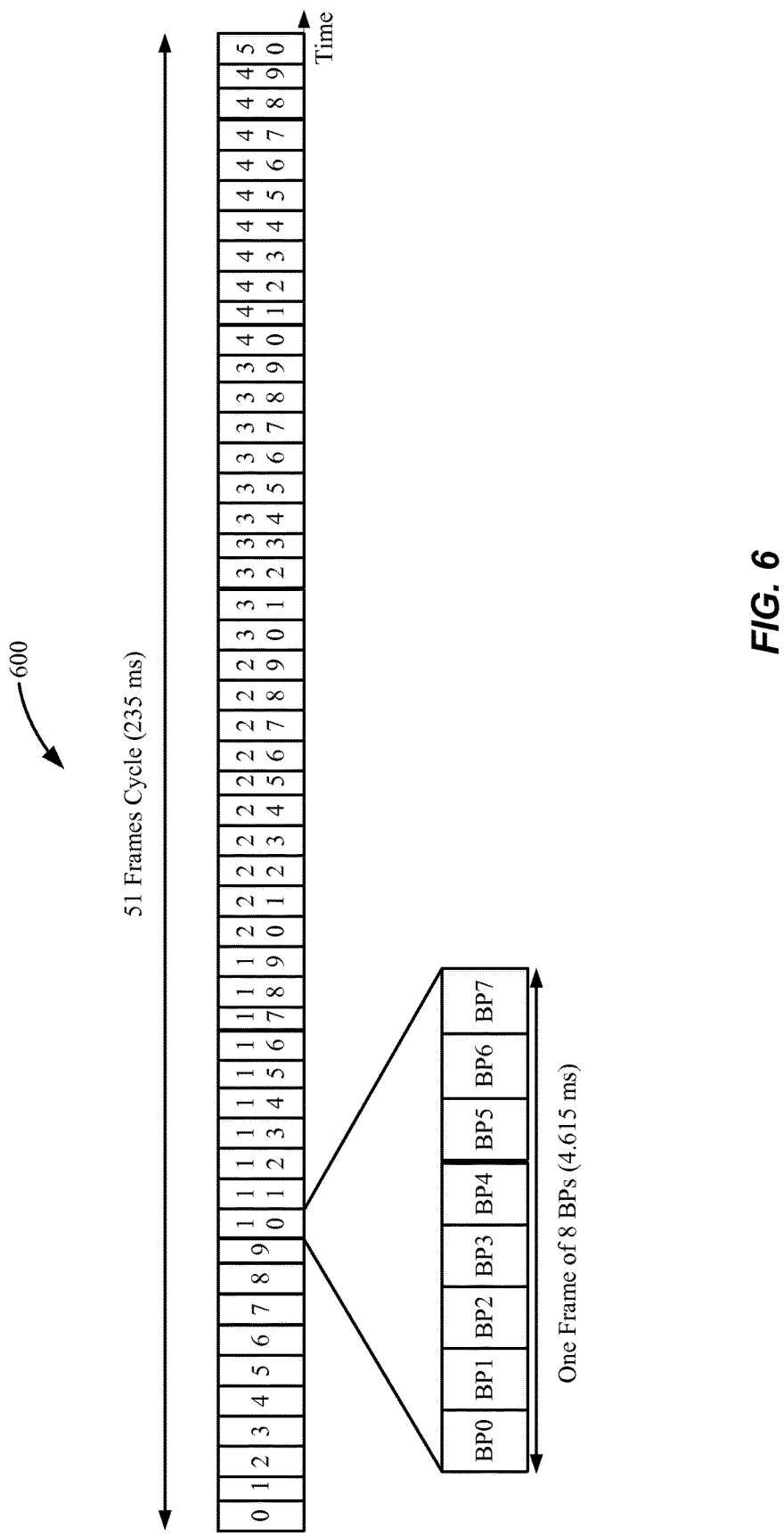
FIG. 6 is a block diagram illustrating an example of a global system for mobile communications (GSM) frame structure.

FIG. 6 is a block diagram illustrating an example of a GSM frame structure 600. The GSM frame structure 600 includes fifty-one frame cycles for a total duration of 235 ms. Each frame of the GSM frame structure 600 may have a frame length of 4.615 ms and may include eight burst periods, BP0-BP7.

Figure 7:
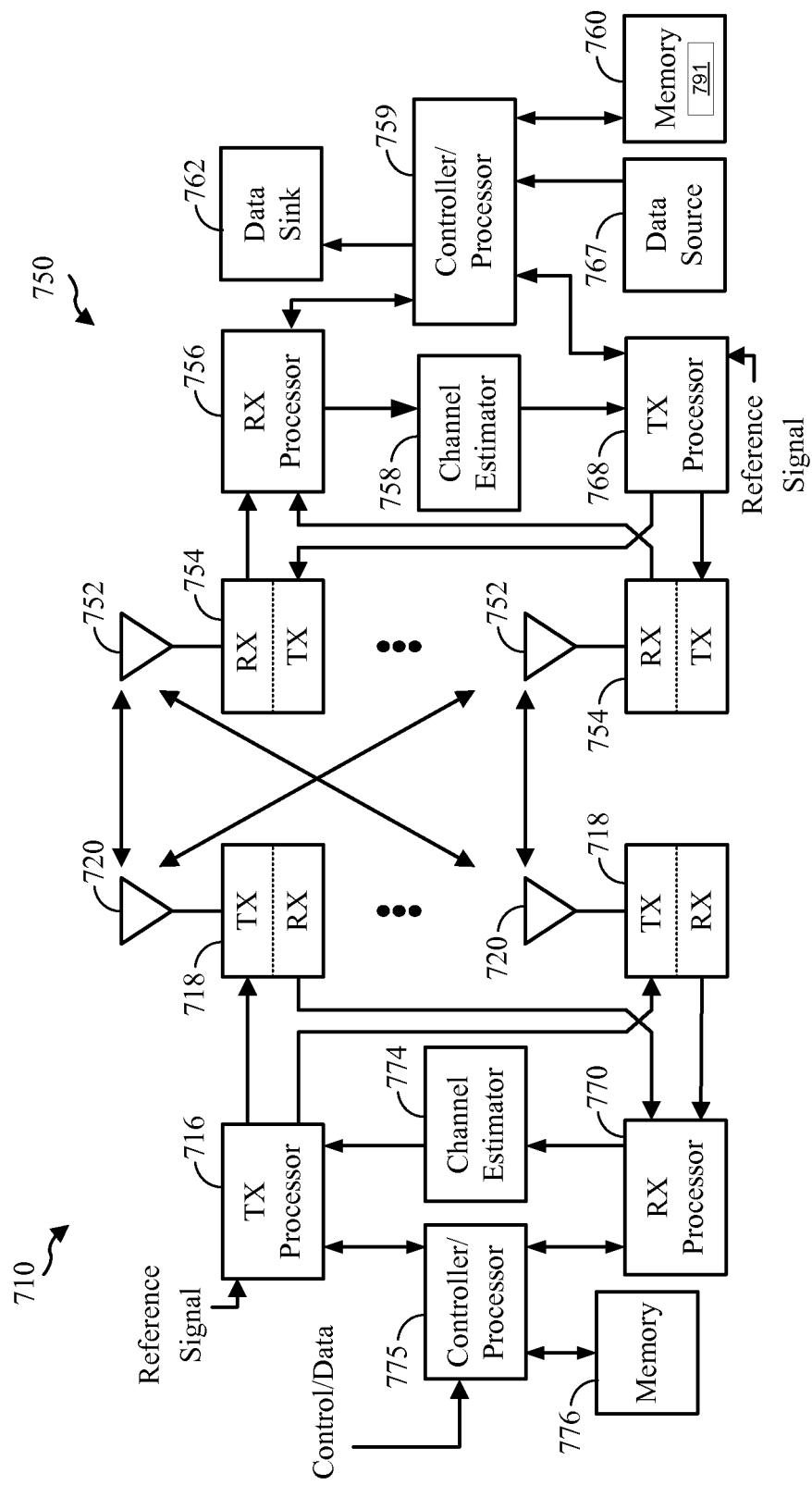
FIG. 7 is a block diagram conceptually illustrating an example of a base station in communication with a user equipment (UE) in a telecommunications system.

FIG. 7 is a block diagram of a base station (e.g., eNodeB or nodeB) 710 in communication with a UE 750 in an access network. In the downlink, upper layer packets from the core network are provided to a controller/processor 775. The controller/processor 775 implements the functionality of the L2 layer. In the downlink, the controller/processor 775 provides header compression, ciphering, packet segmentation and reordering, multiplexing between logical and transport channels, and radio resource allocations to the UE 750 based on various priority metrics. The controller/processor 775 is also responsible for HARQ operations, retransmission of lost packets, and signaling to the UE 750.

The TX processor 716 implements various signal processing functions for the L1 layer (e.g., physical layer). The signal processing functions includes coding and interleaving to facilitate forward error correction (FEC) at the UE 750 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by the UE 750. Each spatial stream is then provided to a different antenna 720 via a separate transmitter (TX) 718. Each transmitter (TX) 718 modulates a radio frequency (RF) carrier with a respective spatial stream for transmission.

At the UE 750, each receiver (RX) 754 receives a signal through its respective antenna 752. Each receiver (RX) 754 recovers information modulated onto an RF carrier and provides the information to the receiver (RX) processor 756. The RX processor 756 implements various signal processing functions of the L1 layer. The RX processor 756 performs spatial processing on the information to recover any spatial streams destined for the UE 750. If multiple spatial streams are destined for the UE 750, they may be combined by the RX processor 756 into a single OFDM symbol stream. The RX processor 756 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the base station 710. These soft decisions may be based on channel estimates computed by the channel estimator 758. The soft decisions are then decoded and deinterleaved to recover the data and control signals that were originally transmitted by the base station 710 on the physical channel. The data and control signals are then provided to the controller/processor 759.

The controller/processor 759 implements the L2 layer. The controller/processor can be associated with a memory 760 that stores program codes and data. The memory 760 may be referred to as a computer-readable medium. In the uplink, the controller/processor 759 provides demultiplexing between transport and logical channels, packet reassembly, deciphering, header decompression, control signal processing to recover upper layer packets from the core network. The upper layer packets are then provided to a data sink 762, which represents all the protocol layers above the L2 layer. Various control signals may also be provided to the data sink 762 for L3 processing. The controller/processor 759 is also responsible for error detection using an acknowledgement (ACK) and/or negative acknowledgement (NACK) protocol to support HARQ operations.

In the uplink, a data source 767 is used to provide upper layer packets to the controller/processor 759. The data source 767 represents all protocol layers above the L2 layer. Similar to the functionality described in connection with the downlink transmission by the base station 710, the controller/processor 759 implements the L2 layer for the user plane and the control plane by providing header compression, ciphering, packet segmentation and reordering, and multiplexing between logical and transport channels based on radio resource allocations by the base station 710. The controller/processor 759 is also responsible for HARQ operations, retransmission of lost packets, and signaling to the base station 710.

Channel estimates derived by a channel estimator 758 from a reference signal or feedback transmitted by the base station 710 may be used by the TX processor 768 to select the appropriate coding and modulation schemes, and to facilitate spatial processing. The spatial streams generated by the TX processor 768 are provided to different antenna 752 via separate transmitters (TX) 754. Each transmitter (TX) 754 modulates an RF carrier with a respective spatial stream for transmission.

The uplink transmission is processed at the base station 710 in a manner similar to that described in connection with the receiver function at the UE 750. Each receiver (RX) 718 receives a signal through its respective antenna 720. Each receiver (RX) 718 recovers information modulated onto an RF carrier and provides the information to a RX processor 770. The RX processor 770 may implement the L1 layer.

The controller/processor 775 implements the L2 layer. The controller/processor 775 and 759 can be associated with memories 776 and 760, respectively that store program codes and data. For example, the controller/processors 775 and 759 may provide various functions including timing, peripheral interfaces, voltage regulation, power management, and other control functions. The memories 776 and 760 may be referred to as a computer-readable media. For example, the memory 760 of the UE 750 may store a measurement technique selection module 791 which, when executed by the controller/processor 759, configures the UE 750 to perform aspects of the present disclosure, including selecting an inter or intra-RAT measurement technique based on communication conditions.

In the uplink, the controller/processor 775 provides demultiplexing between transport and logical channels, packet reassembly, deciphering, header decompression, control signal processing to recover upper layer packets from the UE 750. Upper layer packets from the controller/processor 775 may be provided to the core network. The controller/processor 775 is also responsible for error detection using an ACK and/or NACK protocol to support HARQ operations.

Figure 8:
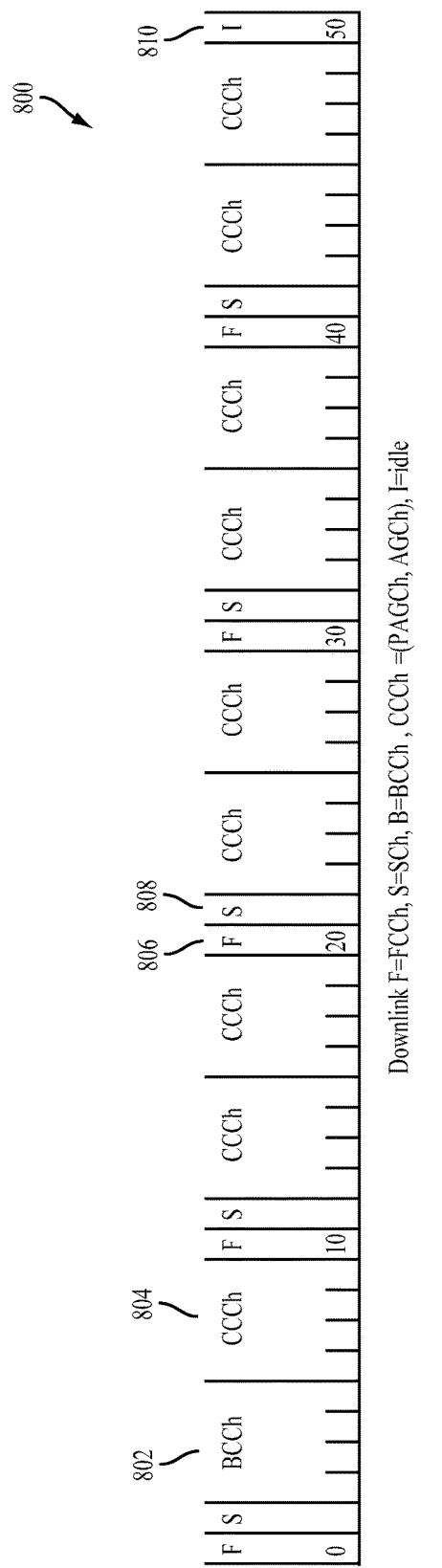
FIG. 8 is a block diagram illustrating the timing of channel carriers according to aspects of the present disclosure.
Figure 9:
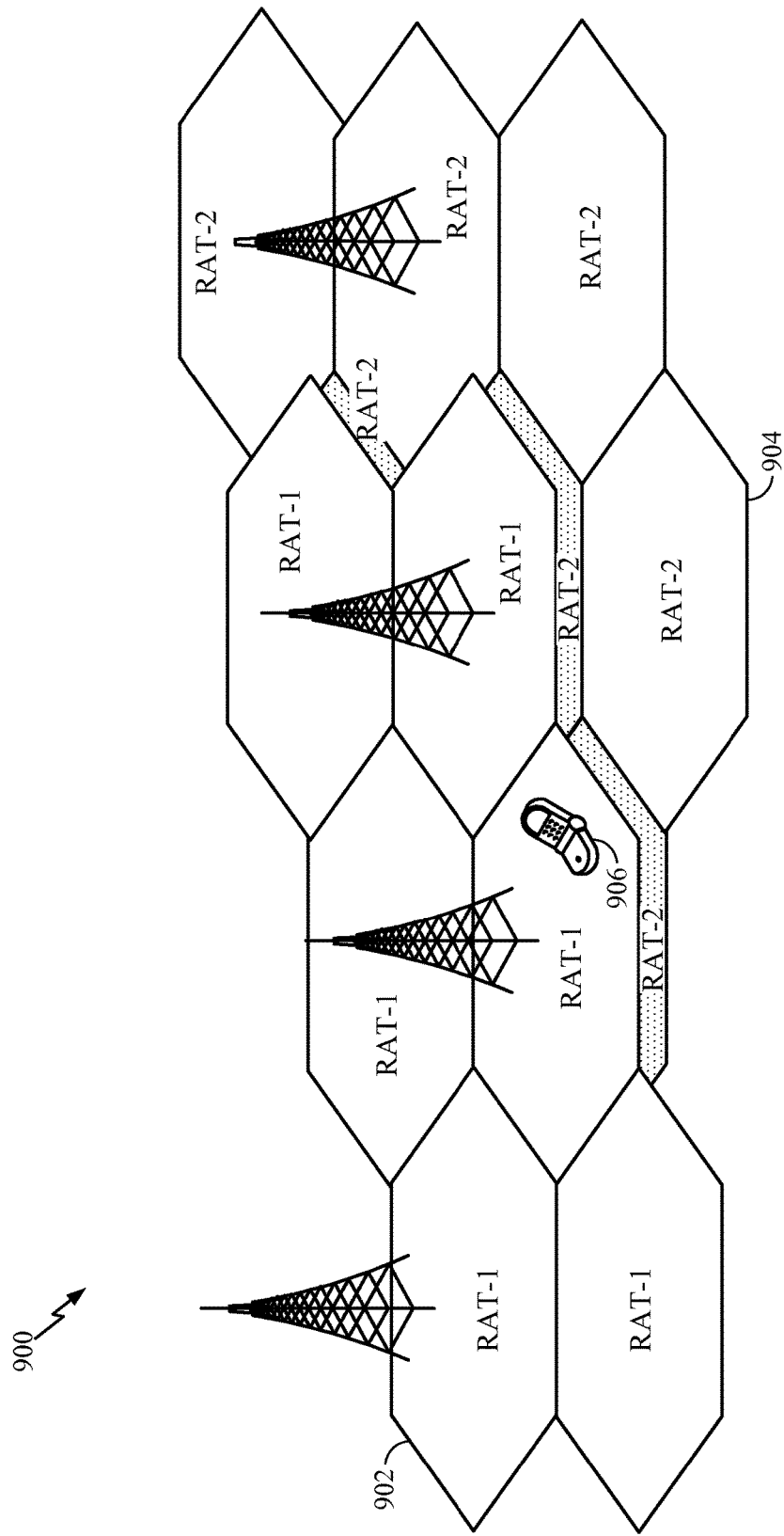
FIG. 9 is a diagram illustrating network coverage areas according to aspects of the present disclosure.

FIG. 8 is a block diagram 800 illustrating the timing of channels according to aspects of the present disclosure. The block diagram 800 shows a broadcast control channel (BCCH) 802, a common control channel (CCCH) 804, a frequency correction channel (FCCH) 806, a synchronization channel (SCH) 808 and an idle time slot 810. The numbers at the bottom of the block diagram 800 indicate various moments in time. In one configuration, the numbers at the bottom of the block diagram 800 are in seconds. Each block of a FCCH 806 may include eight time slots, with only the first timeslot (or TS0) used for FCCH tone detection.

The timing of the channels shown in the block diagram 800 may be determined in a base station identity code (BSIC) identification procedure. The BSIC identification procedure may include detection of the FCCH carrier 806, based on a fixed bit sequence that is carried on the FCCH 806. FCCH tone detection is performed to find the relative timing between multiple RATs. The FCCH tone detection may be based on the SCH 808 being either a first number of frames or a second number of frames later in time than the FCCH 806. The first number of frames may be equal to 11+n·10 frames and the second number of frames may be equal to 12+n·10 frames. The dot operator represents multiplication and n can be any positive number. These equations are used to schedule idle time slots to decode the SCH. The first number of frames and the second number of frames may be used to schedule idle time slots in order to decode the SCH 808, in case the SCH 808 falls into a measurement gap or an idle time slot 810.

For FCCH tone detection in an inter-RAT measurement, the FCCH may fully or partially fall within the idle time slots of the first RAT (not shown). The UE attempts to detect FCCH tones (for example, such as the FCCH 806) on the BCCH carrier of the n strongest BCCH carriers of the cells in the second RAT. The strongest cells in the second RAT may be indicated by a measurement control message. In one configuration, n is eight and the n BCCH carriers are ranked in order of the signal strength. For example, a BCCH carrier may be ranked higher than other BCCH carriers when the signal strength of the BCCH carrier is stronger than the signal strength of the other BCCH carriers. The top ranked BCCH carrier may be prioritized for FCCH tone detection.

Each BCCH carrier may be associated with a neighbor cell in the second RAT. In some instances, the UE receives a neighbor cell list including n ranked neighbor cells from a base station of the first RAT, for example, in a measurement control message. The neighbor cells in the neighbor cell list may be ranked according to signal strength. In some configurations, the n ranked neighbor cells may correspond to the n strongest BCCH carriers, such that system acquisition of the neighbor cells includes FCCH tone detection of these BCCH carriers.

Some networks may be deployed with multiple radio access technologies. FIG. 8 illustrates a network utilizing multiple types of radio access technologies (RATs), such as but not limited to GSM (second generation (2G)), TD-SCDMA (third generation (3G)), LTE (fourth generation (4G)) and fifth generation (5G). Multiple RATs may be deployed in a network to increase capacity. Typically, 2G and 3G are configured with lower priority than 4G. Additionally, multiple frequencies within LTE (4G) may have equal or different priority configurations. Reselection rules are dependent upon defined RAT priorities. Different RATs are not configured with equal priority.

In one example, the geographical area 900 includes RAT-1 cells 902 and RAT-2 cells 904. In one example, the RAT-1 cells are 2G or 3G cells and the RAT-2 cells are LTE cells. However, those skilled in the art will appreciate that other types of radio access technologies may be utilized within the cells. A user equipment (UE) 906 may move from one cell, such as a RAT-1 cell 902, to another cell, such as a RAT-2 cell 904. The movement of the UE 906 may specify a handover or a cell reselection.

The handover or cell reselection may be performed when the UE moves from a coverage area of a first RAT to the coverage area of a second RAT, or vice versa. A handover or cell reselection may also be performed when there is a coverage hole or lack of coverage in one network or when there is traffic balancing between a first RAT and the second RAT networks. As part of that handover or cell reselection process, while in a connected mode with a first system (e.g., TD-SCDMA) a UE may be specified to perform a measurement of a neighboring cell (such as GSM cell). For example, the UE may measure the neighbor cells of a second network for signal strength, frequency channel, and base station identity code (BSIC). The UE may then connect to the strongest cell of the second network. Such measurement may be referred to as inter-radio access technology (IRAT) measurement.

The UE may send a serving cell a measurement report indicating results of the IRAT measurement performed by the UE. The serving cell may then trigger a handover of the UE to a new cell in the other radio access technology (RAT) based on the measurement report. The measurement may include a serving cell signal strength, such as a received signal code power (RSCP) for a pilot channel (e.g., primary common control physical channel (PCCPCH)). The signal strength is compared to a serving system threshold. The serving system threshold can be indicated to the UE through dedicated radio resource control (RRC) signaling from the network. The measurement may also include a neighbor cell received signal strength indicator (RSSI). The neighbor cell signal strength can be compared with a neighbor system threshold. Before handover or cell reselection, in addition to the measurement processes, the base station IDs (e.g., BSICs) are confirmed and re-confirmed.

Ongoing communication on the UE may be handed over from the first RAT to a second RAT based on measurements performed on the second RAT. For example, the UE may tune away to the second RAT to perform the measurements. The UE may hand over communications according to a single radio voice call continuity (SRVCC) procedure. SRVCC is a solution aimed at providing continuous voice services on packet-switched networks (e.g., LTE networks). In the early phases of LTE deployment, when UEs running voice services move out of an LTE network, the voice services can continue in the legacy circuit-switched (CS) domain using SRVCC, ensuring voice service continuity. SRVCC is a method of inter-radio access technology (IRAT) handover. SRVCC enables smooth session transfers from voice over internet protocol (VoIP) over the IP multimedia subsystem (IMS) on the LTE network to circuit-switched services in the universal terrestrial radio access network (UTRAN) or GSM enhanced date rates for GSM Evolution (EDGE) radio access network (GERAN).

LTE coverage is limited in availability. When a UE that is conducting a packet-switched voice call (e.g., voice over LTE (VoLTE) call) leaves LTE coverage or when the LTE network is highly loaded, SRVCC may be used to maintain voice call continuity from a packet-switched (PS) call to a circuit-switched call during IRAT handover scenarios. SRVCC may also be used, for example, when a UE has a circuit-switched voice preference (e.g., circuit-switched fallback (CSFB)) and packet-switched voice preference is secondary if combined attach fails. The evolved packet core (EPC) may send an accept message for packet-switched attach in which case a VoIP/IMS capable UE initiates a packet-switched voice call.

A UE may perform an LTE serving cell measurement. When the LTE serving cell signal strength or quality is below a threshold (meaning the LTE signal may not be sufficient for an ongoing call), the UE may report an event A2 (change of the best frequency). In response to the measurement report, the LTE network may send radio resource control (RRC) reconfiguration messages indicating 2G/3G neighbor frequencies. The RRC reconfiguration message also indicates event B1 (neighbor cell becomes better than an absolute threshold) and/or B2 (a serving RAT becomes worse than a threshold and the inter-RAT neighbor become better than another threshold). The LTE network may also allocate LTE measurement gaps. For example, the measurement gap for LTE is a 6 ms gap that occurs every 40 or 80 ms. The UE uses the measurement gap to perform 2G/3G measurements and LTE inter frequency measurements.

The measurement gap may be used for multiple IRAT measurements and inter frequency measurements. The IRAT measurements may include measurements of frequencies of a different RAT (e.g., non-serving RAT such as TD-SCDMA or GSM). The inter frequency measurements may include measurements of frequencies of a same RAT (e.g., serving LTE). Such frequency measurements of a same RAT may sometimes be referred to as intra-RAT measurements or inter-frequency measurements. For present purposes, the terms "inter-RAT measurement" and "IRAT measurement" shall include measurement of frequencies of a same RAT or measurement of frequencies of a different RAT. Further, the terms "inter-RAT search" and "IRAT search" shall include searching for frequencies of a same RAT or searching for frequencies of a different RAT. In some implementations, the LTE inter frequency measurements and TD-SCDMA IRAT measurements have a higher measurement scheduling priority than GSM.

When the LTE eNodeB receives the event B1 report from the UE, the LTE eNodeB may initiate the SRVCC procedure. The SRVCC procedure may be implemented in a wireless network, such as the wireless network of FIG. 10.

Figure 10:
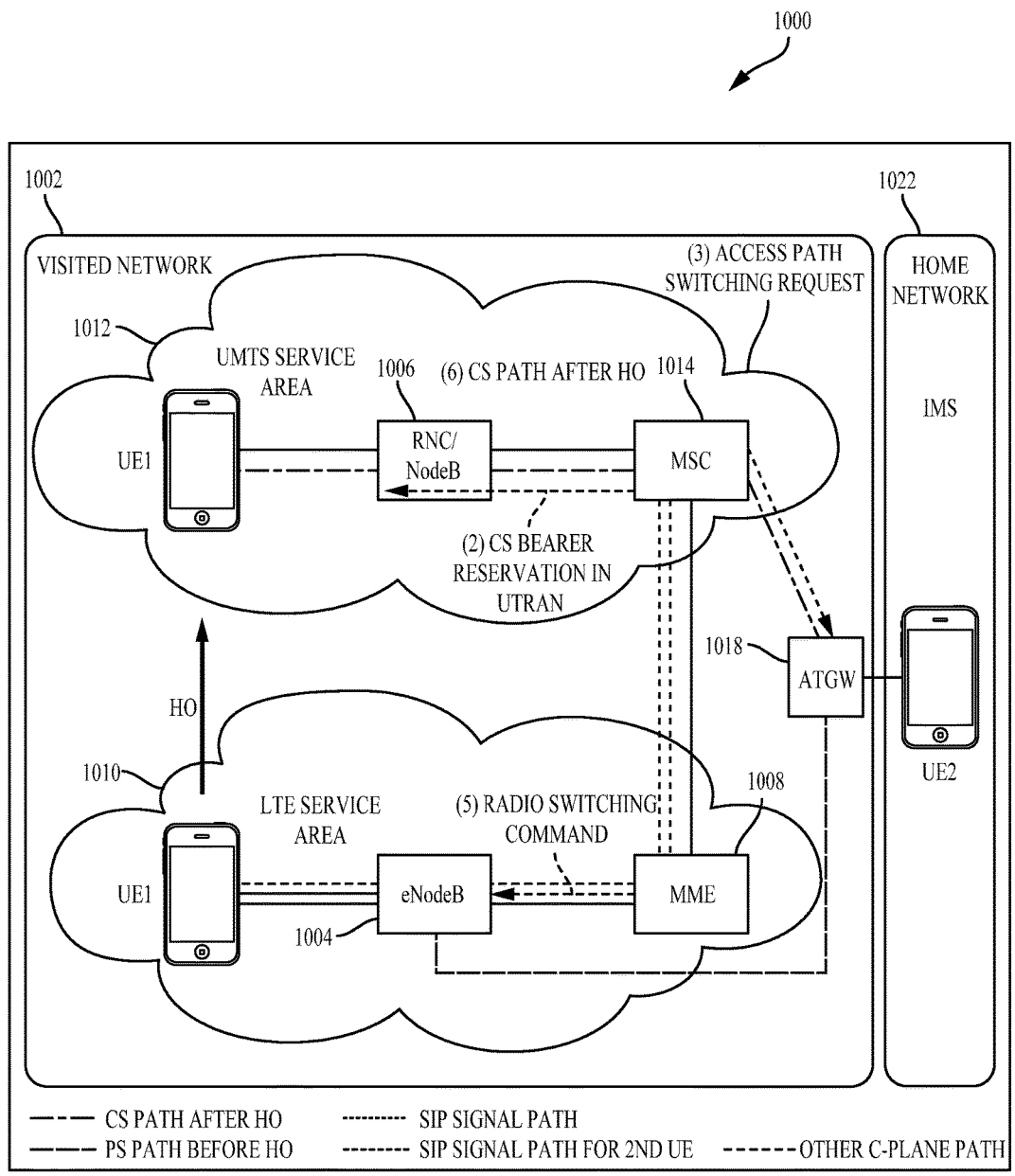
FIG. 10 is a block diagram illustrating a wireless communication network in accordance with aspects of the present disclosure.

FIG. 10 is a block diagram illustrating a wireless communication network 1000 in accordance with aspects of the present disclosure. Referring to FIG. 10, the wireless communication network 1000 may include a visited network 1002 and a home network 1022. The visited network 1002 may include multiple service areas. For example, as shown in FIG. 10, without limitation, the visited network 1002 may include an LTE service area 1010 and a UMTS service area 1012. A first UE (UE1) located in the LTE service area 1010 may conduct a voice call with a second UE (UE2), which is located in the home network 1022. In one aspect, UE1 may conduct a voice call (e.g., a PS call or VoLTE) with UE2 via the access transfer gateway (ATGW) 1018.

When UE1 leaves the LTE service area 1010, the LTE serving cell (eNodeB 1004) signal strength or signal quality may fall below a threshold. As such, UE1 may report an event A2. In turn, the eNodeB 1004 may provide an RRC connection reconfiguration message to UE1. The RRC connection reconfiguration message may include measurement configuration information such as the LTE measurement gap allocation. For example, the LTE gap allocation may be such that a 6 ms measurement gap occurs every 40 ms or every 80 ms.

Accordingly, UE1 may conduct the IRAT and inter-frequency measurements and provide a corresponding measurement report to the eNodeB 1004, which may initiate the handover of coverage to the NodeB 1006 of the UMTS service area 1012. The mobility management entity (MME) 1008 may initiate an SRVCC procedure for the handover. A switch procedure may be initiated to transfer the voice call to a circuit-switched network. An access path switching request is sent via the mobile switching center (MSC) 1014, which routes the voice call to UE2 via the access transfer gateway (ATGW) 1018. Thereafter, the call between UE1 and UE2 may be transferred to a circuit-switched call. The various communication links or paths are represented by solid and different dashed lines. The communication paths include circuit-switched (CS) path after handover (HO), packet-switched path before handover, session initiation protocol (SIP) signal path, session initiation protocol signal path for a second UE (UE2) and a communication plane (C-plane) path.

Figure 11:
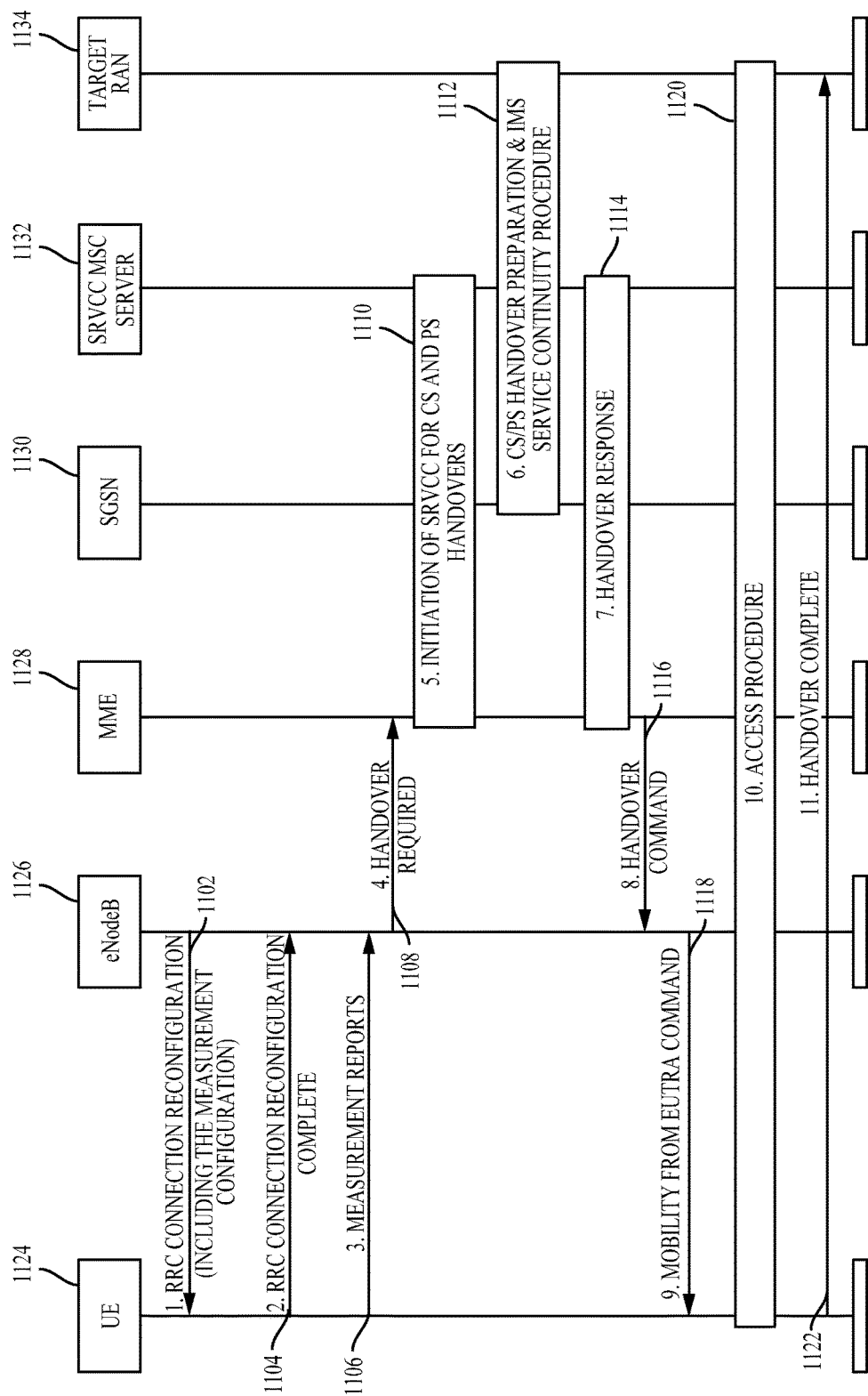
FIG. 11 is an exemplary call flow diagram illustrating a signaling procedure for handover of UE communicating according to a single radio voice call continuity (SRVCC) procedure.

FIG. 11 is an exemplary call flow diagram illustrating a signaling procedure for handover of a UE communicating according to a single radio voice call continuity (SRVCC) procedure. At time 1102, an eNodeB 1126 sends an RRC connection reconfiguration message to a UE 1124. The RRC connection configuration message may include the measurement configuration with information regarding the measurement gap resources.

At time 1104, the UE 1124 sends a message to the eNodeB 1126 indicating that RRC connection reconfiguration is complete. In addition, at time 1106, the UE 1124 also sends a measurement report to the eNodeB 1126. The eNodeB 1126 provides an indication of whether handover is desirable to the mobility management entity (MME) 1128 at time 1108. In turn, at time 1110, the MME 1128 initiates SRVCC for circuit-switched (CS) and packet-switched (PS) handovers. At time 1112, a serving GPRS support node (SGSN) 1130 begins CS/PS handover preparation and IMS service continuity procedures. At time 1114, the SRVCC MSC server 1132 sends a handover response message to the MME 1128. At time 1116, the MME sends a message to the eNodeB 1126 including a handover command. At time 1118, the eNodeB 1126 provides a mobility from EUTRA command (e.g., handover command) to the UE 1124. At time 1120, the UE 1124 initiates an access procedure. At time 1122, a handover complete message is sent to the target radio access network (RAN) 1134.

Handover in conventional systems may be achieved following performing IRAT measurements. For example, the IRAT searches and/or measurements include inter-RAT measurements, LTE inter-frequency searches and measurements, 3G searches and measurements, GSM searches and measurements, etc. followed by base station identity code (BSIC) procedures. The measurements may be attempted in measurements gaps that are inadequate (e.g., short duration such as 6 ms gap) for completion of the measurement procedure. In one instance, BSIC procedures may not be accomplished because a base station identification information does not fall within the short duration measurement gap. The BSIC procedures include frequency correction channel (FCCH) tone detection and synchronization channel (SCH) decoding that are performed after signal quality measurements.

When the base station identification information falls outside of the short duration measurement gap, the UE may be unable to detect the base station identification information and may be unable synchronize with a target cell. For example, using a conventional 6 ms gap for every predefined time period (e.g., 40 ms or 80 ms), the base station identification information (e.g., FCCH and/or SCH) may not occur within the short duration measurement gap. That is, the FCCH and/or SCH do not occur during a remaining 5 ms gap after a frequency tuning period of 1 ms. If the UE is unable to detect the base station identification information communications may be interrupted. Further, repeated failed attempts by the UE may waste the UE's power.

The unpredictable failure of the FCCH/SCH to occur within the short duration measurement gap causes a variation of the IRAT measurement latency (e.g., increasing IRAT measurement latency). The failure of the FCCH/SCH to occur within the measurement gap may be due to a relative time between a serving RAT (e.g., LTE) and a neighbor RAT (e.g., GSM). The relative time impacts a time duration for the FCCH/SCH to fall into the 5 ms useful measurement gap (lms for frequency tuning). For example, the allocated time resources (e.g., frame timing) for the serving RAT and the neighbor RAT may be misaligned or offset, which causes failure of the FCCH/SCH to occur within the measurement gap of the serving RAT.

Because the UE may not be aware of the cause of the failure to detect the FCCH tone, for example, the UE may continue to attempt to detect the FCCH tone until an abort timer expires, which may cause delays in or interruptions to UE communications. For example, the UE may not be aware that the failure to detect the FCCH tone of the strongest frequency with the highest RSSI is due to low signal to noise ratio or FCCH occurring outside the measurement gap. As a result, the UE waits for an abort timer (e.g., 5 ms) to expire and then moves to the next strongest frequency. Waiting for expiration of the abort timer unnecessarily increase the IRAT measurement latency. However, if the UE aborts the FCCH tone detection prematurely, the UE may miss a chance of the FCCH occurring during the measurement gap.

After the measurements, the UE may send a measurement report to the serving RAT. For example, the UE only sends the measurement report (e.g., B1 measurement report) after the completion of the BSIC procedures. Thus, the reporting of the results of the signal quality measurement, which occurs over a shorter period and which may occur on multiple occasions before the completion of the BSIC procedures, are delayed. Further, a transmission time interval (TTI) may expire prior to the completion of the BSIC procedures that result in an increase in latency or communication interruption. Measurement reports are transmitted to a network after the expiration of the TTI. Because the BSIC procedures are not complete, the measurement reports cannot be sent even when the TTI expires. An exemplary search and measurement procedure is illustrated in FIG. 12.

Figure 12:
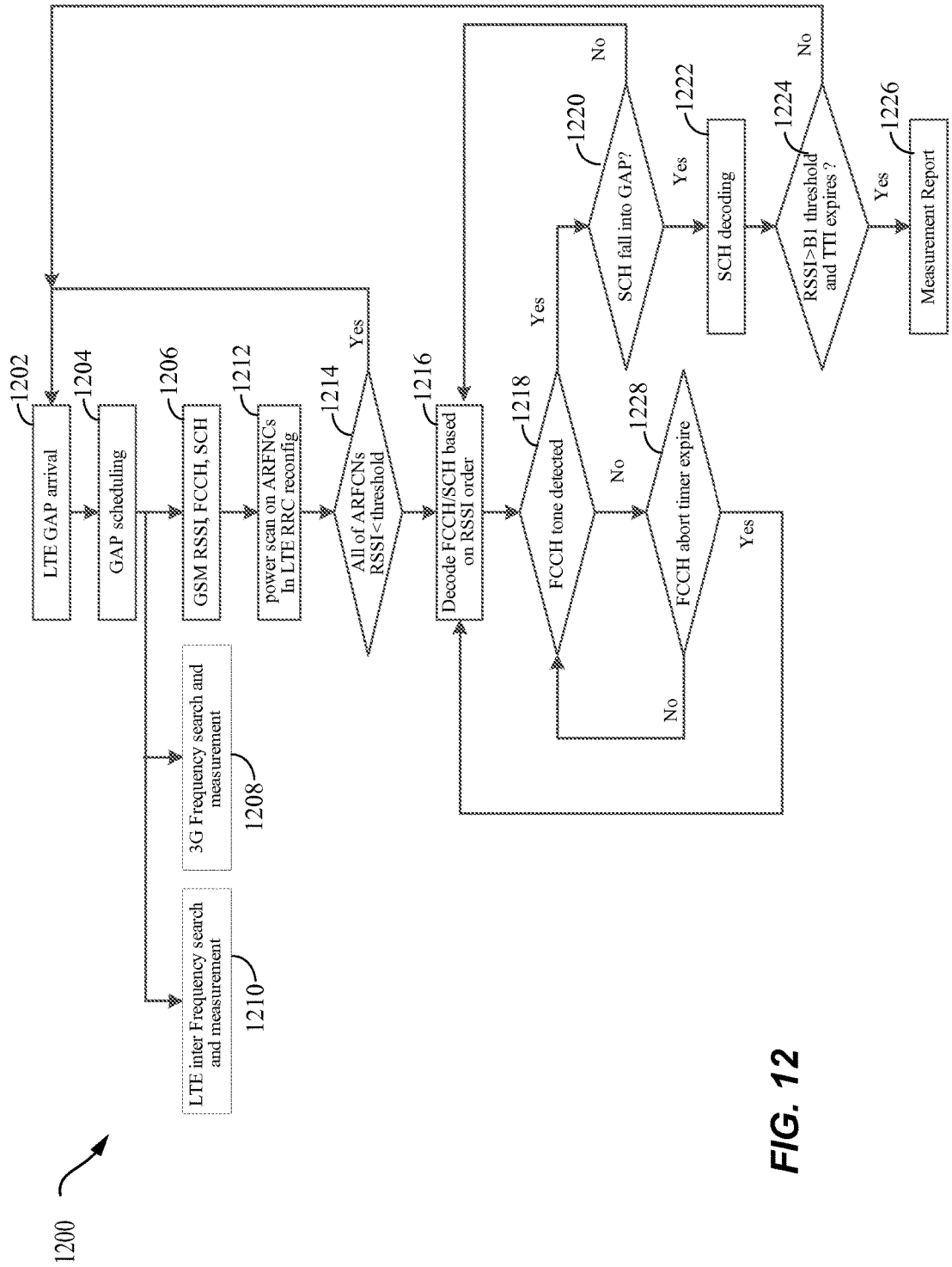
FIG. 12 is a flow diagram illustrating an example decision process for search and measurement of neighbor cells.

FIG. 12 is a flow diagram illustrating an example decision process for search and measurement of neighbor cells. The measurement may occur when the UE is on a first RAT (e.g., LTE) with a short duration measurement gap (e.g., 6 ms) every predefined period (e.g., 40 ms or 80 ms). The searches and measurements may include inter frequency searches and measurements and inter-radio access technology (IRAT) searches and measurements. At block 1202, measurement gap information transmitted by a network of the first RAT is received by the UE. For example, the measurement gap for LTE is a 6 ms gap that occurs every 40 or 80 ms. The UE uses the measurement gap to perform 2G/3G (e.g., TD-SCDMA and GSM) searches and measurements and LTE searches and measurements. A search and/or measurement schedule for the neighbor cells may be received by the UE from the network, as shown in block 1204. The searches and measurements of the neighbor cells may be scheduled based on priority. For example, searches and measurements of LTE/TD-SCDMA neighbor cells or frequencies may have a higher priority than GSM neighbor cells. At blocks 1206, 1208 and 1210, the UE performs inter-radio access technology (IRAT) searches and/or measurements. The IRAT searches and/or measurements include LTE inter-frequency searches and measurements, 3G searches and measurements, GSM searches, measurements and BSIC procedures, respectively, according to the schedule.

The user equipment performs measurements by scanning frequencies (e.g., power scan), as shown in block 1212. The UE then determines whether a signal quality of a serving cell of a first RAT and the signal quality of neighbor cells meet a threshold, as shown in block 1214. For example, it is determined whether the signal qualities (e.g., RSSIs) of the neighbor cells are less than the threshold. The threshold can be indicated to the UE through dedicated radio resource control (RRC) (e.g., LTE RRC reconfiguration) signaling from the network. When the signal quality of the neighbor cells fail to meet a threshold the process returns to block 1202, in which the UE receives a next measurement gap information. However, when the signal qualities of one or more target neighbor cells meet the threshold, the UE continues to perform the BSIC procedures, as shown in block 1216. The BSIC procedures may be performed on the target neighbor cells in order of signal quality. For example, the BSIC procedures may be performed on the cell with the best signal quality, followed by the cell with the second best signal quality and so on. The BSIC procedures include frequency correction channel (FCCH) tone detection and synchronization channel (SCH) decoding) that are performed after signal quality measurements.

In block 1218, the UE may determine whether a FCCH tone is detected for a cell of the target cells (e.g., cell with best signal quality). If the FCCH tone is detected for the best cell, the UE determines whether the SCH falls into the measurement gap, as shown in block 1220. In block 1220, if the SCH does not fall into the measurement gap, the process returns to block 1216, where the UE decodes FCCH/SCH for the target cell with the second best signal quality. However, if the SCH of the target neighbor cell with the best signal quality falls into the measurement gap, the UE performs SCH decoding, as shown in block 1222. The UE then determines whether the signal quality of the target neighbor cell is greater that the threshold (e.g., B1 threshold) and whether the TTI has expired, as shown in block 1224. If the TTI expired and the signal quality of the target neighbor cell is not greater than the threshold, the process returns to block 1202, where the UE receives the measurement gap information. However, if the TTI expired and the signal quality of the target neighbor cell is greater than the threshold, the process continues to block 1226, where the UE sends a measurement report to the network. As noted, measurement reports are transmitted to a network only after the expiration of the TTI, even when the other conditions, such as ab RSSI being greater than the threshold are met.

When it is determined that the FCCH tone for the target neighbor cell is not detected at block 1218, the process continues to block 1228, where it is determined whether the FCCH abort timer expired. If the FCCH abort time is not expired, the process returns to block 1218, where the UE continues to determine whether FCCH tone is detected for the target neighbor cell. Otherwise, when it is determined that the FCCH abort timer expired at block 1228, the process returns to block 1216 where FCCH/SCH is decoded for the next target neighbor cell.

The BSIC procedures, which include frequency correction channel (FCCH) tone detection and synchronization channel (SCH) decoding) that are performed after signal quality measurements, may further cause a drain in the UE battery power. For example, the UE may repeatedly attempt to detect a FCCH tone or to decode SCH when the SCH/FCCH does not fall in an allocated measurement gap. The repeated attempts further drain the UE battery power.

Power savings is especially important to ensure improved or optimum battery life for packet-switched devices (e.g., VoLTE devices) where voice calls (voice over internet protocol calls) can be frequent and long. During the voice over internet protocol calls, voice packet arrivals may exhibit traffic characteristics that are discontinuous. A discontinuous reception (DRX) mechanism may be implemented to reduce power consumption based on the discontinuous traffic characteristics of the voice packet arrivals.

Figure 13:
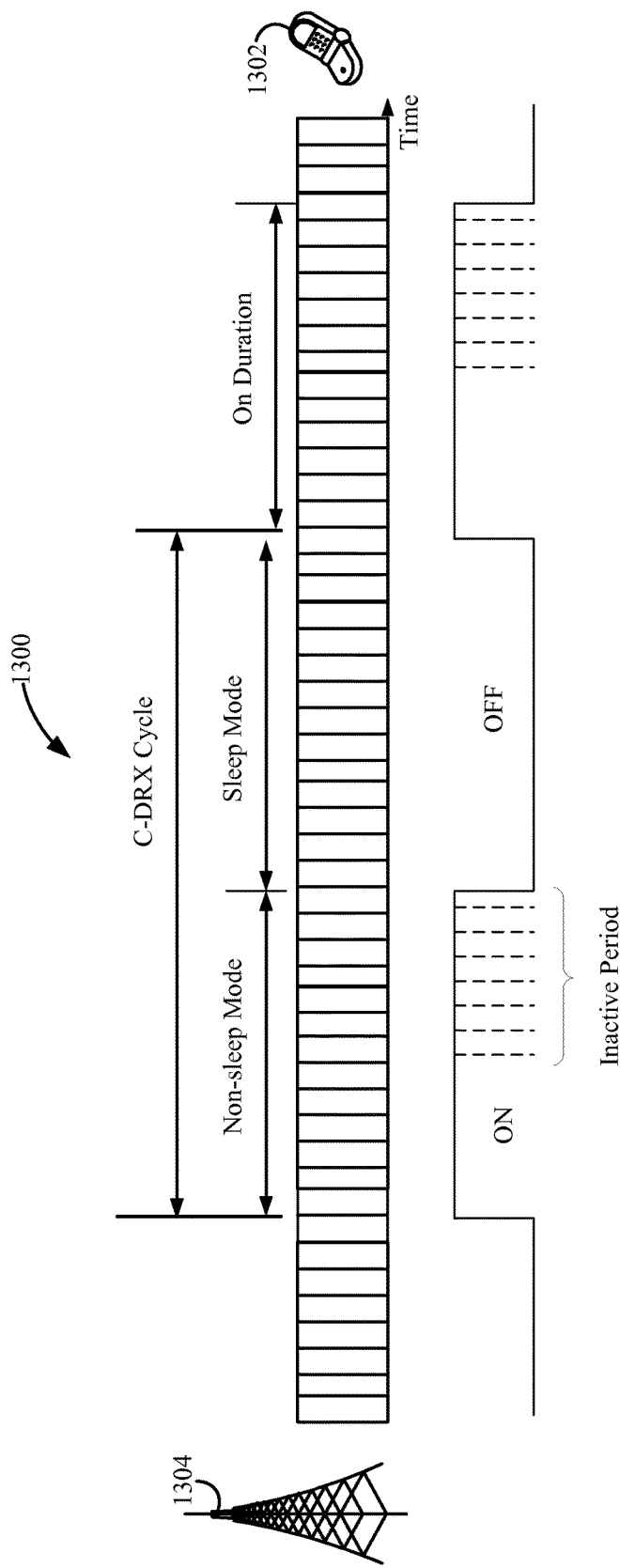
FIG. 13 illustrates an exemplary discontinuous reception communication cycle.

An exemplary discontinuous reception communication cycle 1300 is illustrated in FIG. 13. The discontinuous reception cycle may correspond to a communication cycle where a user equipment (UE) 1302 is in a connected state (e.g., connected discontinuous reception (C-DRX) cycle). In the C-DRX cycle, the UE 1302 may have an ongoing communication (e.g., voice call). For example, the ongoing communication may be discontinuous because of the inherent discontinuity in voice communications. The discontinuous communication cycle may also apply to other calls (e.g., multimedia calls).

The C-DRX cycle includes a time period/duration allocated for the UE 1302 to sleep (e.g., sleep mode or C-DRX off period or mode). In the sleep mode, the UE 1302 may power down some of its components (e.g., receiver or receive chain is shut down). For example, when the UE 1302 is in the connected state (e.g., RRC connected state) and communicating according to the C-DRX cycle, power consumption may be reduced by shutting down a receiver of the UE 1302 for short periods. The C-DRX cycle also includes a time periods when the UE 1302 is awake (e.g., a non-sleep mode). The non-sleep mode may include a C-DRX on period and/or a C-DRX inactive period. The C-DRX on period corresponds to periods of communication (e.g., when the user is talking). The C-DRX inactive period, however, occurs during a pause in the communication (e.g., pauses in the conversation) that occurs prior to the sleep mode.

The UE 1302 enters the sleep mode to conserve energy when the pause in the communication extends beyond a duration of an inactivity timer. The duration of the C-DRX inactive period is defined by the inactivity timer. For example, the UE 1302 enters the sleep mode when the inactivity timer initiated at a start of the pause, expires. In some implementations, a duration of the inactivity timer and corresponding C-DRX inactive period, the C-DRX on period and the C-DRX off period may be defined by a network. For example, the total DRX cycle may be 40 ms (e.g., one subframe corresponds to 1 ms). The C-DRX on period may have a duration of 4 subframes, the C-DRX inactive period may have a duration of 10 subframes and the C-DRX off period may have a duration of 26 subframes.

During the non-sleep mode, such as the C-DRX inactive period, the UE 1302 monitors for downlink information such as a grant. For example, the downlink information may include physical downlink control channel (PDCCH) of each subframe. The PDCCH may carry information to allocate resources for UEs 1302 and control information for downlink channels. During the sleep mode, however, the UE 1302 skips monitoring the PDCCH to save battery power. To achieve the power savings, the serving base station (e.g., eNodeB) 1304, which is aware of the sleep and non-sleep modes of the communication cycle, skips scheduling downlink transmissions during the sleep mode. Thus, the UE 1302 does not receive downlink information during the sleep mode and can therefore skip monitoring for downlink information to save battery power.

For example, when the UE is in the connected state and a time between the arrival of voice packets is longer than the inactivity timer (e.g., inactivity timer expires between voice activity) the UE transitions into the sleep mode. A start of the inactivity timer may coincide with a start of the C-DRX inactive/off period of an ongoing communication. The end of the inactivity timer may coincide with a start of the sleep mode or an end to the non-sleep mode provided there is no intervening reception of data prior to the expiration of the inactivity timer. When there is an intervening reception of data, the inactivity timer is reset.

In some implementations, the UE is awake during the time period allocated for the sleep mode. For example, during the time period allocated for the sleep mode, the UE performs activities or measurement procedures such as signal quality (e.g., RSSI) measurements and/or BSIC procedures (e.g., timing (FCCH/SCH) detection/decoding) instead of falling asleep. The UE first performs the signal quality measurements (e.g., IRAT measurements) by scanning frequencies (e.g., power scan) for a list of neighbor frequencies (e.g., GSM frequencies) indicated in a radio resource control (RRC) reconfiguration message, such as LTE RRC reconfiguration message. The UE then performs the BSIC procedures (e.g., timing detection such as FCCH tone detection and SCH decoding) based on a ranked order of the frequencies. For example, the frequencies may be ranked according to their measured signal quality. The signal quality measurements and the BSIC procedures may be performed until the time period allocated for the sleep mode ends. In some implementations, however, the duration of the sleep mode is insufficient for the measurement procedures. For example, the duration of the sleep mode may be too short to complete FCCH tone detection and/or SCH decoding, which may repeat periodically (e.g., every 10 to 11 frames).

Performing the IRAT measurements during the C-DRX inactive/off period reduces the battery life. Further, the battery life may be unnecessarily degraded, when the IRAT measurements are performed when a signal quality of a current serving cell fails to meet a measurement reporting condition. For example, the measurement reporting condition is not met when the signal quality of the serving cell is below a threshold indicated by a network supporting the serving cell. The threshold may be based on event B2 procedures.

A user equipment (UE) may support multiple receive chains. For example, the UE may support a first receive chain and a second receive chain. The first receive chain and the second receive chain enable communication with, for example, a first subscriber identity module (SIM) and a second SIM. Each of the first receive chain and the second receive chain may include a first receiver path (e.g., primary receiver path) and a second receiver path (e.g., diversity receiver path). In some implementations, the first and the second receiver paths may be supported by a same antenna. Alternatively, the first receiver path and the second receiver path may be supported by a first antenna and a second antenna, respectively.

Figure 14:
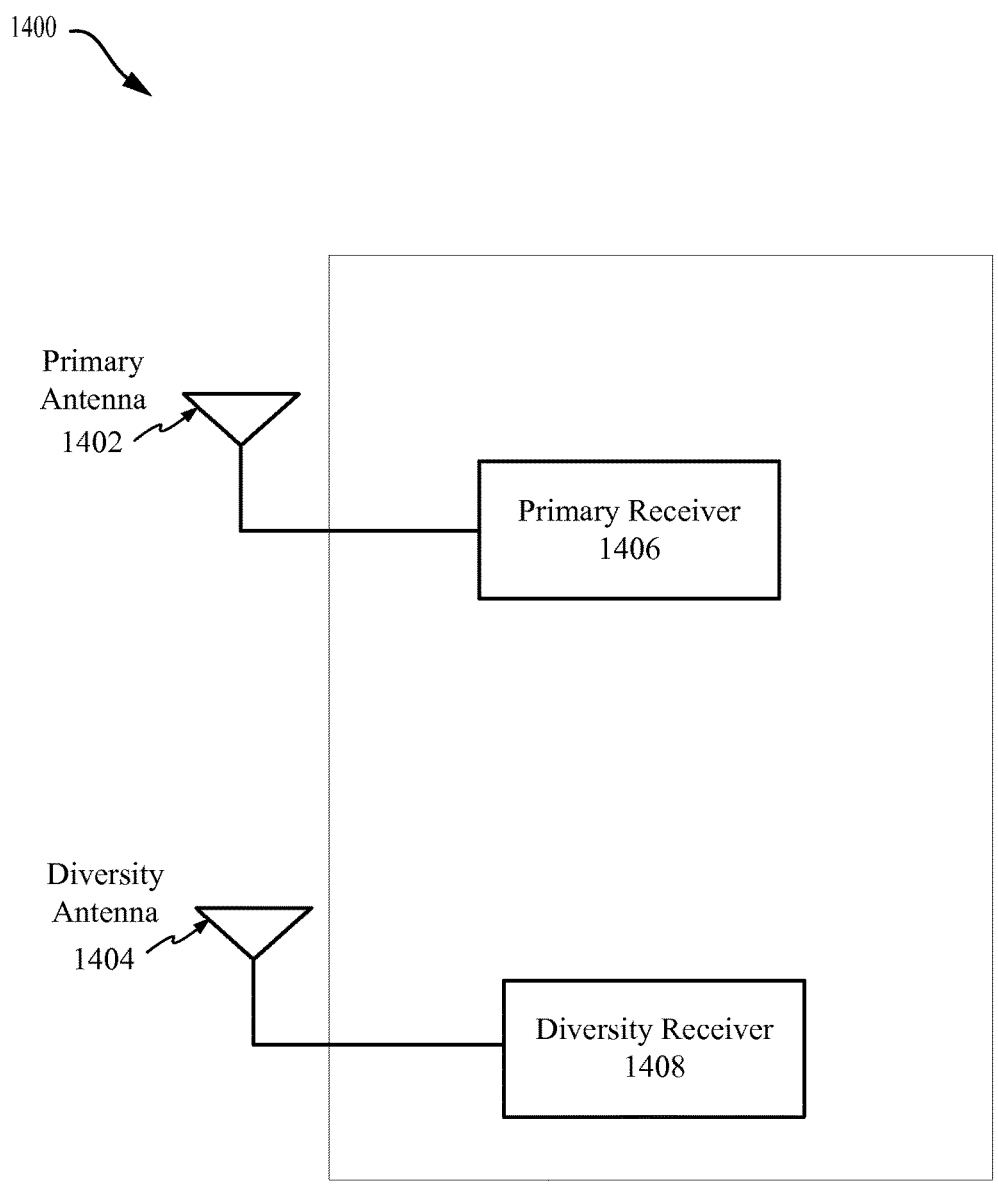
FIG. 14 illustrates a user equipment with a multiple receiver configuration including a first receive chain and a second receive chain.

FIG. 14 illustrates a user equipment 1400 with a multiple receiver configuration including a first receive chain and a second receive chain. For example, the first receive chain includes a first antenna (e.g., primary antenna) 1402 coupled to a first (e.g., primary) receiver 1406 of a first radio frequency chip. Similarly, the second receive chain may include a second antenna (e.g., diversity antenna) 1404 coupled to a second (e.g., diversity) receiver 1408 of a second radio frequency chip. The first and second radio frequency chips may be the same or different. The multiple receiver configuration allows the UE to perform wireless activities simultaneously. For example, the UE can communicate with the first receive chain and the second receive chain simultaneously. The UE can also perform measurements with the different receive chains prior to handover. The measurements may be performed after an event (e.g., event 2A) that triggers the handover.

In some implementations, the measurements (e.g., IRAT measurements) are performed during measurement gaps (e.g., 6 ms gap) allocated by a network. The IRAT measurements may include LTE inter-frequency measurements, 3G measurements, GSM measurements, etc. The IRAT measurements are followed by base station identity code (BSIC) procedures. The BSIC procedures include downlink timing detection and synchronization decoding. For example, the BSIC procedures include frequency correction channel (FCCH) tone detection and synchronization channel (SCH) decoding that are performed after signal quality measurements. FCCH tone detection enables determination of downlink timing while SCH decoding is for cell identification.

The UE may attempt to perform the signal quality measurements and BSIC procedures in the allocated measurements gaps. However, the allocated gaps may be inadequate (e.g., short duration such as 6 ms gap) for completion of the BSIC procedures. For example, BSIC procedures may not be accomplished because some base station identification information (e.g., FCCH tone detection information and/or SCH information) does not fall within the short duration measurement gap. When the base station identification information falls outside of the short duration measurement gap, the UE may be unable to detect the base station identification information and may be unable to synchronize with a target cell.

If the UE is unable to detect the base station identification information, communications may be interrupted. For example, delays are introduced to the IRAT measurement and overall handover procedure due to a frequency correction channel (FCCH) and/or synchronization channel (SCH) occurring outside the gap. The interruption may also cause a call (e.g., voice over packet-switched RAT (e.g., VoLTE) call) on the UE to be dropped before the handover (e.g., SRVCC handover).

Some UEs are equipped with other receivers (e.g., a second receiver) and may perform the measurements and the BSIC procedures using the second receiver or receive chain. This implementation where the UE performs the measurements and BSIC procedures using the second receive chain is referred to as a gap-less measurement procedure. Similar to performing the measurements and BSIC procedures during the allocated measurement gaps, performing the measurements and BSIC procedures using the second receiver or receive chain may be subject to interruptions and/or delays that may result in dropped calls. Furthermore, UEs without the second receiver or receive chain for performing the IRAT measurements or BSIC procedures may be further subjected to degraded communications (e.g., VoLTE communication). For example, data reception is degraded especially when allocated measurement gaps using a first or primary receiver or receive chain are inadequate. Such degraded data reception negatively impacts VoLTE voice quality before SRVCC handover.

Adaptive Selection of Inter-RAT Measurement Techniques

During a VoLTE call, a UE may continue to perform cell measurement (including inter-RAT measurement or inter-frequency measurement). The LTE connection may include a 6 ms gap every 40 or 80 ms to perform cell measurement.

This gap, however, may not fall at the right time during the communication frames of the target cell in order to complete the necessary measurement (e.g., FCCH or SCH measurement). Further, during a VoIP call, voice packet arrival is discontinuous. As explained above in reference to FIG. 13, DRX may be used by a UE during a VoIP call to reduce power consumption. During the C-DRX off period, the UE may not go to sleep and instead perform cell measurement. The UE may perform neighbor cell measurement, which can impact the UE battery consumption. This may be inefficient, particularly for certain types of measurement that may not employ FCCH tone detection and/or SCH decoding. Further, if the UE has multiple receiver capability (e.g., diversity receivers or multiple receive chains) as explained above in reference to FIG. 14, additional receivers may be used for cell measurement to allow the UE to otherwise sleep during the C-DRX off period.

Proposed is a solution in which the UE may determine the communication conditions experienced by the UE and may dynamically and adaptively determine IRAT measurement technique based on a number of factors, including the experienced communication conditions. The UE may switch from a first technique for IRAT measurement to a second technique for IRAT measurement based on a change in one or more factors or communication conditions. The communication conditions may include radio frequency (RF) conditions experienced by the UE, such as the signal quality of a serving base station, the signal quality of a neighbor base station, the rank reporting of the UE (i.e., a channel quality change in rank reported from the UE), or the like. The communication conditions may also include conditions such as the quality of service (QoS) specifications of a particular communication connection, whether an ongoing call includes a VoIP call, VoLTE call, packet-switched data call (for example an ongoing gaming call) or circuit-switched voice call, the battery status of the UE, the length of the C-DRX off period (e.g., if it is long enough to perform IRAT measurement), an availability of a second receiver to perform the IRAT measurement, whether the IRAT measurement is for signal strength (RSSI) measurement or for synchronization channel (SCH) decoding, and/or at least one receiver being removed or deactivated by the serving base station during communications using carrier aggregation or other conditions.

The method/technique of IRAT measurement may be selected from (a) using a communication gap for IRAT measurement, (b) using a C-DRX off period for IRAT measurement, (c) using an additional receiver to perform IRAT measurement, or (d) a UE autonomously creating a gap for IRAT measurement. The UE may autonomously create a gap by halting receiving and/or transmitting with a serving cell and use the UE's receiver for IRAT measurement.

For example, in one situation, if a UE reports Rank 2 (e.g., reporting a multiple-input multiple-output (MIMO) mode) and if the LTE serving cell and neighbor cell signal quality are above a threshold, and the IRAT measurement is for signal quality measurement (where precise alignment of the measured signal may not be as important), the UE may use method (a) to perform measurement during the gap period and may go to sleep during the C-DRX off period. This way, the UE will not remove a MIMO receiver for IRAT measurement, and may continue non-measurement communications using two receivers to achieve higher throughput during the normal call.

In another situation, the UE reports Rank 1, and the LTE serving cell and neighbor cell quality are below a threshold, and the IRAT measurement is for FCCH tone detection and SCH decoding (where the UE has to measure the appropriate channels, as illustrated in FIG. 8). In this situation, the UE may use method (b) to perform IRAT measurement during the C-DRX off period or the UE may use method (c) to use an additional receiver for IRAT measurement, such as a diversity receiver or a separate receive chain.

In another situation, if a UE battery status indicates a battery of the UE is close to running out of power, the UE may determine not to use the C-DRX off period for IRAT measurement (choosing instead to use the C-DRX off period to go to sleep to conserve battery power).

Other factors to help determine which method to use include a length of the off duration. For example, if the off duration is longer, then it is more likely that the off duration will be selected for measurement. The number of component carriers in a carrier aggregation configuration can also be considered. If multiple component carriers are activated, it is less desirable to measure with another receive chain. Similarly, receiver status can be a factor in the selection. If more receivers ae available, then it would be more desirable to measure with one of the idle receivers.

The UE may be capable of adaptively switching an IRAT measurement technique. For example, a UE may use a first IRAT measurement technique at a first time and use a second IRAT measurement technique at a second time. The UE may switch IRAT measurement techniques based on a change in communication conditions of the UE, for example conditions as described above. For example, if serving cell signal quality becomes poor, and a longer gap is needed for IRAT measurement, a UE may switch to using a second receiver for IRAT measurement, or may perform IRAT measurement during a C-DRX off period. The time frame for a change in communication condition may vary. For example, a change in rank reporting may occur every 10 subframes and the selection of the measurement technique can then occur every 10 subframes. In other examples, the selected technique can change after every measurement, after every subframe, or after every C-DRX period (e.g., on plus off period).

Figure 15:
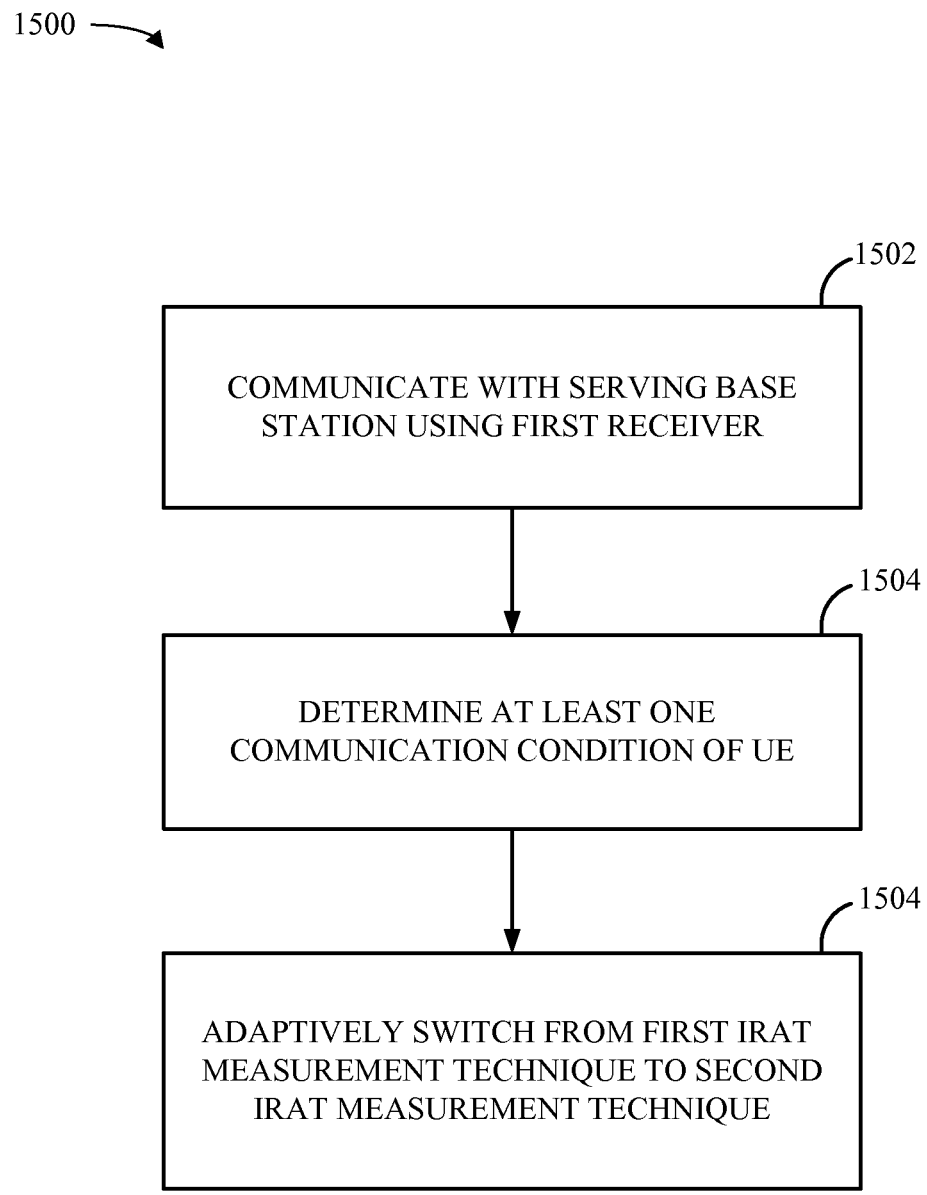
FIG. 15 is a flow diagram illustrating a method for adaptively switching a measurement technique according to one aspect of the present disclosure.

FIG. 15 shows a wireless communication method 1500 according to one aspect of the disclosure. At block 1502, a user equipment (UE) communicates with a serving base station using a first receiver. At block 1504, the UE determines at least one communication condition experienced by the UE. The at least one communication condition may comprise whether the IRAT measurement is for signal strength measurement or for synchronization channel decoding. At block 1506, the UE adaptively switches from a first technique for inter-radio access technology (IRAT) measurement to a second technique for IRAT measurement based on the communication conditions. The second technique may be selected from among one of the following techniques: (1) using a communication gap for IRAT measurement, (2) using a discontinuous reception cycle (C-DRX) off period for IRAT measurement, (3) using a second receiver to perform IRAT measurement, and (4) autonomously creating a gap in communications with the base station and using the created gap for IRAT measurement. The second receiver may be an additional receiver of the UE or a diversity receiver of the UE.

Figure 16:
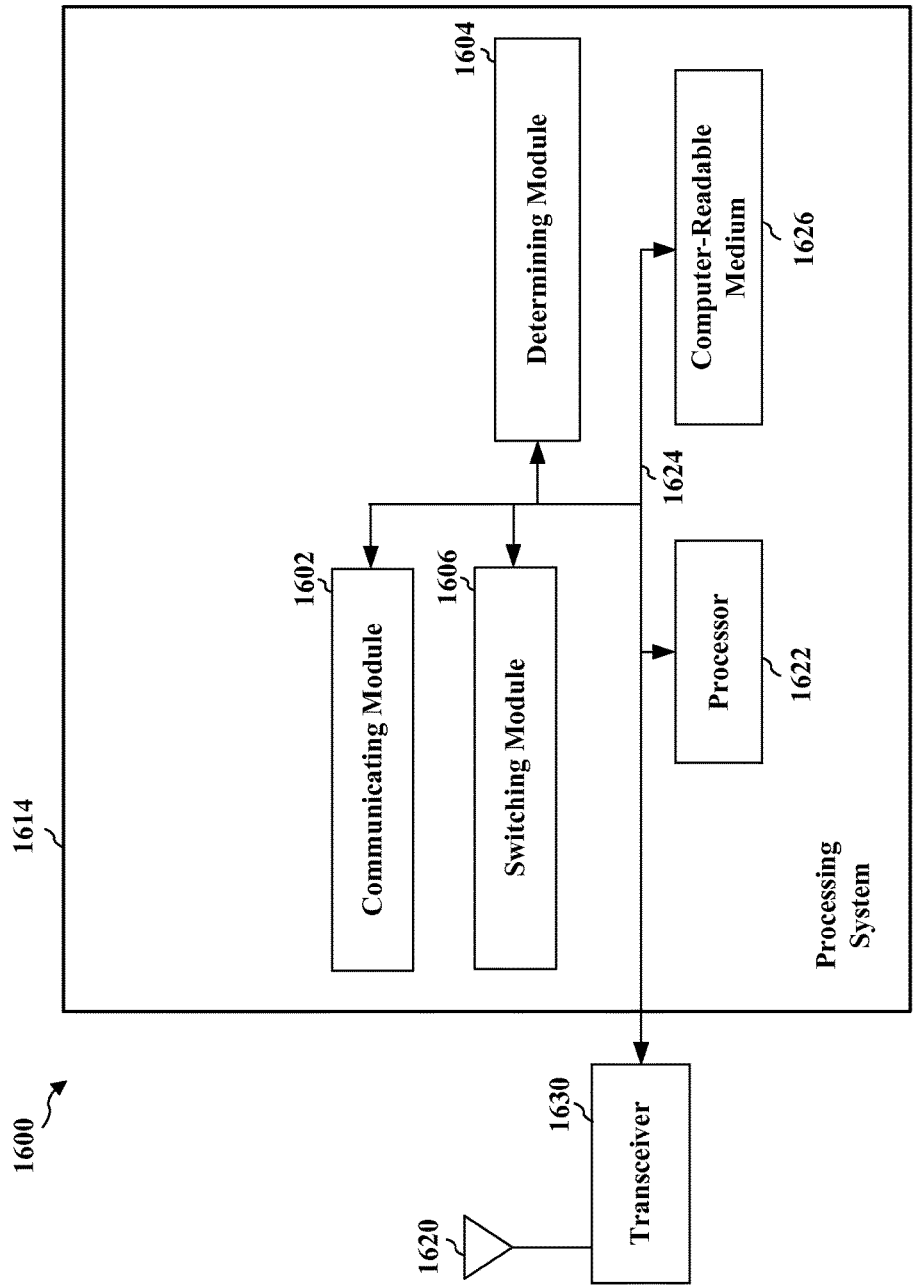
FIG. 16 is a diagram illustrating an example of a hardware implementation for an apparatus employing a processing system according to one aspect of the present disclosure.

FIG. 16 is a diagram illustrating an example of a hardware implementation for an apparatus 1600 employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware modules, represented by the processor 1622 the modules 1602-1606 and the non-transitory computer-readable medium 1626. The bus 1624 may also link various other circuits such as timing sources, peripherals, voltage regulators, and power management circuits, which are well known in the art, and therefore, will not be described any further.

The apparatus includes a processing system 1614 coupled to a transceiver 1630. The transceiver 1630 is coupled to one or more antennas 1620. The transceiver 1630 enables communicating with various other apparatus over a transmission medium. The processing system 1614 includes a processor 1622 coupled to a non-transitory computer-readable medium 1626. The processor 1622 is responsible for general processing, including the execution of software stored on the computer-readable medium 1626. The software, when executed by the processor 1622, causes the processing system 1614 to perform the various functions described for any particular apparatus. The computer-readable medium 1626 may also be used for storing data that is manipulated by the processor 1622 when executing software.

The processing system 1614 includes a communicating module 1602 for communicating with a base station. The processing system 1614 also includes a determining module 1604 for determining communication conditions of the UE. The processing system 1614 may also include a switching module 1606 for adaptively switching a technique for performing IRAT measurement. The modules 1602-1606 may be software modules running in the processor 1622, resident/stored in the computer-readable medium 1626, one or more hardware modules coupled to the processor 1622, or some combination thereof. The processing system 1614 may be a component of the UE 750 of FIG. 7 and may include the memory 760, and/or the controller/processor 759.

In one configuration, an apparatus such as a UE 750 is configured for wireless communication including means for communicating. In one aspect, the communicating means may be the antennas 752/1620, the receiver 754, the transceiver 1630, the receive processor 756, the controller/processor 759/1622, the memory 760/1626, the communicating module 1602, and/or the processing system 1614 configured to perform the aforementioned means. In one configuration, the means functions correspond to the aforementioned structures. In another aspect, the aforementioned means may be a module or any apparatus configured to perform the functions recited by the aforementioned means.

The UE 750 is also configured to include means for determining. In one aspect, the determining means may include the antennas 752/1620, the receiver 754, the transceiver 1630, the receive processor 756, the controller/processor 759/1622, the memory 760/1626, the determining module 1604, the measurement technique selection module 791, a battery, and/or the processing system 1614 configured to perform the functions recited by the identifying means. In one configuration, the means and functions correspond to the aforementioned structures. In another aspect, the aforementioned means may be a module or any apparatus configured to perform the functions recited by the determining means.

The UE 750 is also configured to include means for adaptively switching. In one aspect, the switching means may include the receive processor 756, the controller/processor 759/1622, the memory 760, the receiver 754, the transceiver 1630, the measurement technique selection module 791, the switching module 1606 and/or the processing system 1614 configured to perform the aforementioned means. In one configuration, the means and functions correspond to the aforementioned structures. In another aspect, the aforementioned means may be a module or any apparatus configured to perform the functions recited by the switching means.

Several aspects of a telecommunications system has been presented with reference to LTE, TD-SCDMA and GSM systems. As those skilled in the art will readily appreciate, various aspects described throughout this disclosure may be extended to other telecommunication systems, network architectures and communication standards, including those with high throughput and low latency such as 4G systems, 5G systems and beyond. By way of example, various aspects may be extended to other UMT S systems such as W-CDMA, high speed downlink packet access (HSDPA), high speed uplink packet access (HSUPA), high speed packet access plus (HSPA+) and TD-CDMA. Various aspects may also be extended to systems employing long term evolution (LTE) (in FDD, TDD, or both modes), LTE-advanced (LTE-A) (in FDD, TDD, or both modes), CDMA2000, evolution-data optimized (EV-DO), ultra mobile broadband (UMB), IEEE 802.11 (Wi-Fi), IEEE 802.16 (WiMAX), IEEE 802.20, ultra-wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the term "signal quality" is non-limiting. Signal quality is intended to cover any type of signal metric such as received signal code power (RSCP), reference signal received power (RSRP), reference signal received quality (RSRQ), received signal strength indicator (RSSI), signal to noise ratio (SNR), signal to interference plus noise ratio (SINR), etc.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for wireless communication for a user equipment (UE) comprising:
   communicating with a serving base station using a first receiver;
   determining at least one communication condition experienced by the UE, including determining whether an IRAT measurement (inter-radio access technology measurement) is for signal strength measurement or for synchronization channel decoding; and
   adaptively switching from a first technique for the IRAT measurement to a second technique for the IRAT measurement based at least in part on the determining of the at least one communication condition experienced by the UE including the determining whether an IRAT measurement is for signal strength measurement or for synchronization channel decoding, in which the second technique is at least one of:
   using a communication gap configured by a network for the IRAT measurement,
   using a connected discontinuous reception cycle (C-DRX) off period for the IRAT measurement,
   using a second receiver to perform the IRAT measurement, or
   autonomously creating a gap in communications with the serving base station and using a created gap for the IRAT measurement.

2. The method of claim 1, in which the at least one communication condition further comprises a signal quality of the serving base station and/or the signal quality of a neighbor base station.

3. The method of claim 1, in which the at least one communication condition further comprises a channel quality change in rank reported from the UE.

4. The method of claim 1, in which the at least one communication condition further comprises whether the communicating with the serving base station involves a voice over internet protocol (VoIP) call or a packet-switched data call.

5. The method of claim 1, in which the at least one communication condition further comprises a battery status of the UE.

6. The method of claim 1, in which the at least one communication condition further comprises an availability of the second receiver to perform the IRAT measurement.

7. The method of claim 1, in which the at least one communication condition further comprises at least one receiver being removed or deactivated by the serving base station during communications using carrier aggregation.

8. A user equipment for wireless communication, the user equipment comprising:
   means for communicating with a serving base station using a first receiver;
   means for determining at least one communication condition experienced by the user equipment, including means for determining whether an inter-radio access technology measurement (IRAT measurement) is for signal strength measurement or for synchronization channel decoding; and
   means for adaptively switching from a first technique for the IRAT measurement to a second technique for the IRAT measurement based at least in part on the determining of the at least one communication condition experienced by the UE including the determining whether an IRAT measurement is for signal strength measurement or for synchronization channel decoding, in which the second technique is at least one of:
   using a communication gap configured by a network for the IRAT measurement,
   using a connected discontinuous reception cycle (C-DRX) off period for the IRAT measurement,
   using a second receiver to perform the IRAT measurement, or
   autonomously creating a gap in communications with the serving base station and using a created gap for the IRAT measurement.

9. The user equipment of claim 8, in which the at least one communication condition further comprises a signal quality of the serving base station and/or the signal quality of a neighbor base station.

10. The user equipment of claim 8, in which the at least one communication condition further comprises a channel quality change in rank reported from the user equipment.

11. A computer program product for wireless communication in a network by a user equipment, comprising:
a non-transitory computer-readable medium having non-transitory program code recorded thereon, the program code comprising:
program code to communicate with a serving base station using a first receiver;
program code to determine at least one communication condition experienced by the user equipment, including program code to determine whether an inter-radio access technology measurement (IRAT measurement) is for signal strength measurement or for synchronization channel decoding; and
program code to adaptively switch from a first technique for the IRAT measurement to a second technique for the IRAT measurement based at least in part on the determining of the at least one communication condition experienced by the UE including the determining whether an IRAT measurement is for signal strength measurement or for synchronization channel decoding, in which the second technique is at least one of:
using a communication gap configured by the network for the IRAT measurement,
using a connected discontinuous reception cycle (C-DRX) off period for the IRAT measurement,
using a second receiver to perform the IRAT measurement, or
autonomously creating a gap in communications with the serving base station and using a created gap for the IRAT measurement.

12. The computer program product of claim 11, in which the at least one communication condition further comprises a signal quality of the serving base station and/or the signal quality of a neighbor base station.

13. The computer program product of claim 11, in which the at least one communication condition further comprises a channel quality change in rank reported from the user equipment.

14. A user equipment for wireless communication, comprising:
a memory;
a transceiver configured to communicate with a serving base station; and
at least one processor coupled to the memory and configured:
to communicate with a serving base station using a first receiver;
to determine at least one communication condition experienced by the user equipment, including determining whether an inter-radio access technology measurement (IRAT measurement) is for signal strength measurement or for synchronization channel decoding; and
to adaptively switch from a first technique for the IRAT measurement to a second technique for the IRAT measurement based at least in part on the determining of the at least one communication condition experienced by the UE including the determining whether an IRAT measurement is for signal strength measurement or for synchronization channel decoding, in which the second technique is at least one of:
using a communication gap configured by a network for the IRAT measurement,
using a connected discontinuous reception cycle (C-DRX) off period for the IRAT measurement,
using a second receiver to perform the IRAT measurement, or
autonomously creating a gap in communications with the serving base station and using a created gap for the IRAT measurement.

15. The user equipment of claim 14, in which the at least one communication condition further comprises a signal quality of the serving base station and/or the signal quality of a neighbor base station.

16. The user equipment of claim 14, in which the at least one communication condition further comprises a channel quality change in rank reported from the user equipment.

17. The user equipment of claim 14, in which the at least one communication condition further comprises whether the communicating with the serving base station involves a voice over internet protocol (VoIP) call or a packet-switched data call.

18. The user equipment of claim 14, in which the at least one communication condition further comprises a battery status of the user equipment.

19. The user equipment of claim 14, in which the at least one communication condition further comprises an availability of the second receiver to perform the IRAT measurement.

20. The user equipment of claim 14, in which the at least one communication condition further comprises at least one receiver being removed or deactivated by the serving base station during communications using carrier aggregation.

* * * * *